United States Patent [19]

Chivetta et al.

[11] Patent Number: 4,472,845
[45] Date of Patent: Sep. 25, 1984

[54] LATCHING SYSTEM FOR ADJUSTABLE MOTORIZED HOSPITAL BED

[75] Inventors: Dennis S. Chivetta, Ballwin; Joseph A. Volk, Jr., Florissant, both of Mo.

[73] Assignee: B-W Health Products, Inc., Maryland Heights, Mo.

[21] Appl. No.: 298,422

[22] Filed: Sep. 1, 1981

[51] Int. Cl.$^3$ .............................................. A61G 7/00
[52] U.S. Cl. .............................................. 5/63; 5/66
[58] Field of Search .................................. 5/60–69; 318/65, 281, 285

[56] References Cited

U.S. PATENT DOCUMENTS

| | | | |
|---|---|---|---|
| 3,778,769 | 12/1973 | Hong et al. | 5/64 |
| 3,913,153 | 10/1975 | Adams et al. | 5/68 |
| 3,921,048 | 11/1975 | Padgitt | 318/480 |
| 3,993,940 | 11/1976 | Volk, Jr. | 318/207 B |
| 4,110,856 | 9/1978 | Benoit et al. | 5/68 |
| 4,271,545 | 6/1981 | Christian | 5/66 |
| 4,324,010 | 4/1982 | Houlberg et al. | 5/68 |

Primary Examiner—Alexander Grosz
Assistant Examiner—Michael F. Trettel
Attorney, Agent, or Firm—Gravely, Lieder & Woodruff

[57] ABSTRACT

Independently operable head and foot adjusting mechanisms are provided in an adjustable motorized hospital bed in order to facilitate independent height adjustment of the head and foot ends of the bed's movable frame, on which is mounted a mattress supporting structure. Logic circuitry controls the actuation of the adjusting mechanisms to manipulate the movable frame to any level or tilted position desired. When the frame is to be lowered to its lowermost level, a latching system may be latched in a down operating mode, merely by momentarily actuating a switch, to cause the head and foot adjusting mechanisms to lower each end of the movable frame directly to its lowermost limit regardless of the frame's position, and even though the frame may be tilted, at the time the switch is actuated. With such direct and immediate access to the lowermost level position, considerable time can be saved by the nurse or attendant.

12 Claims, 19 Drawing Figures

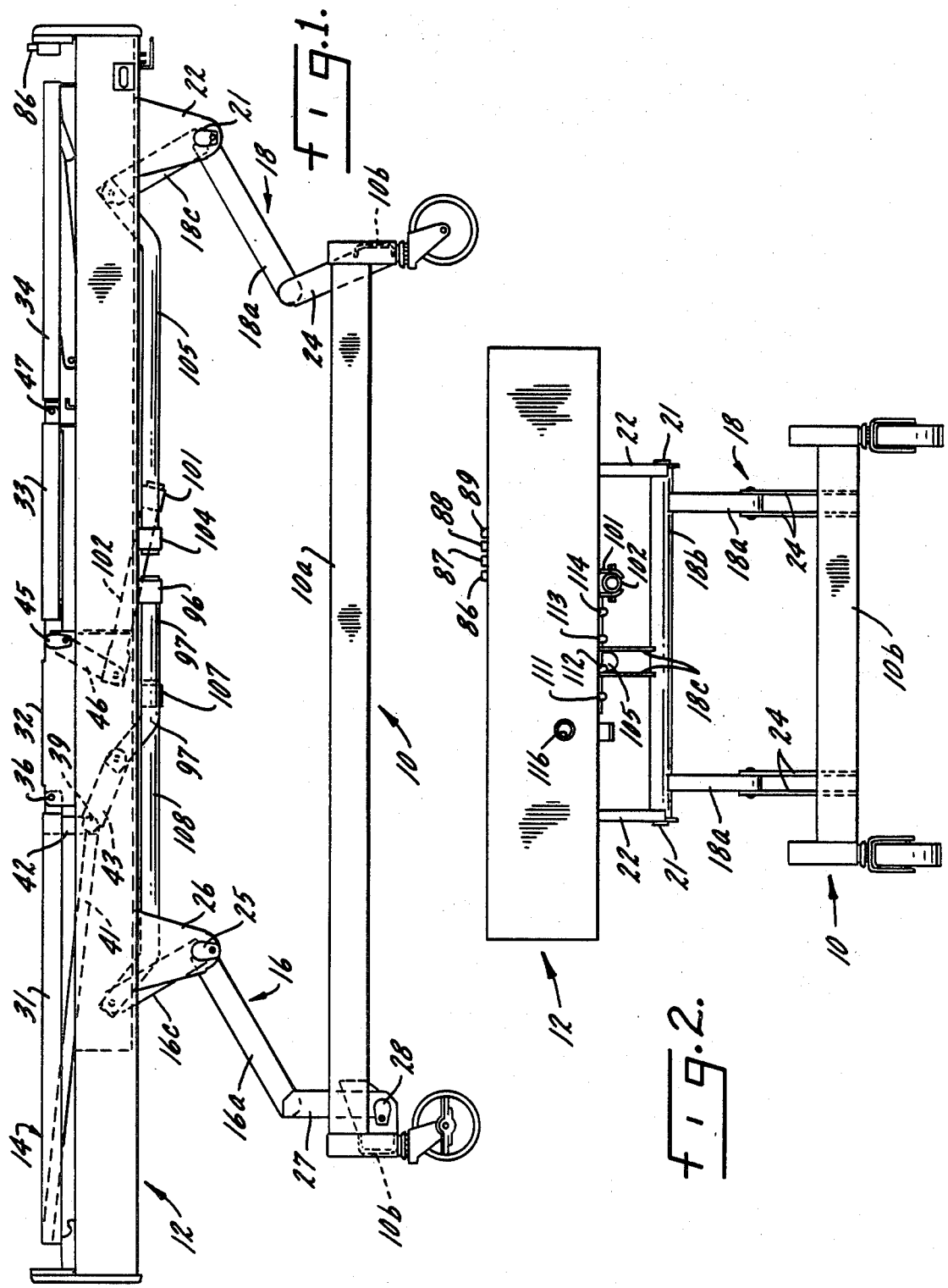

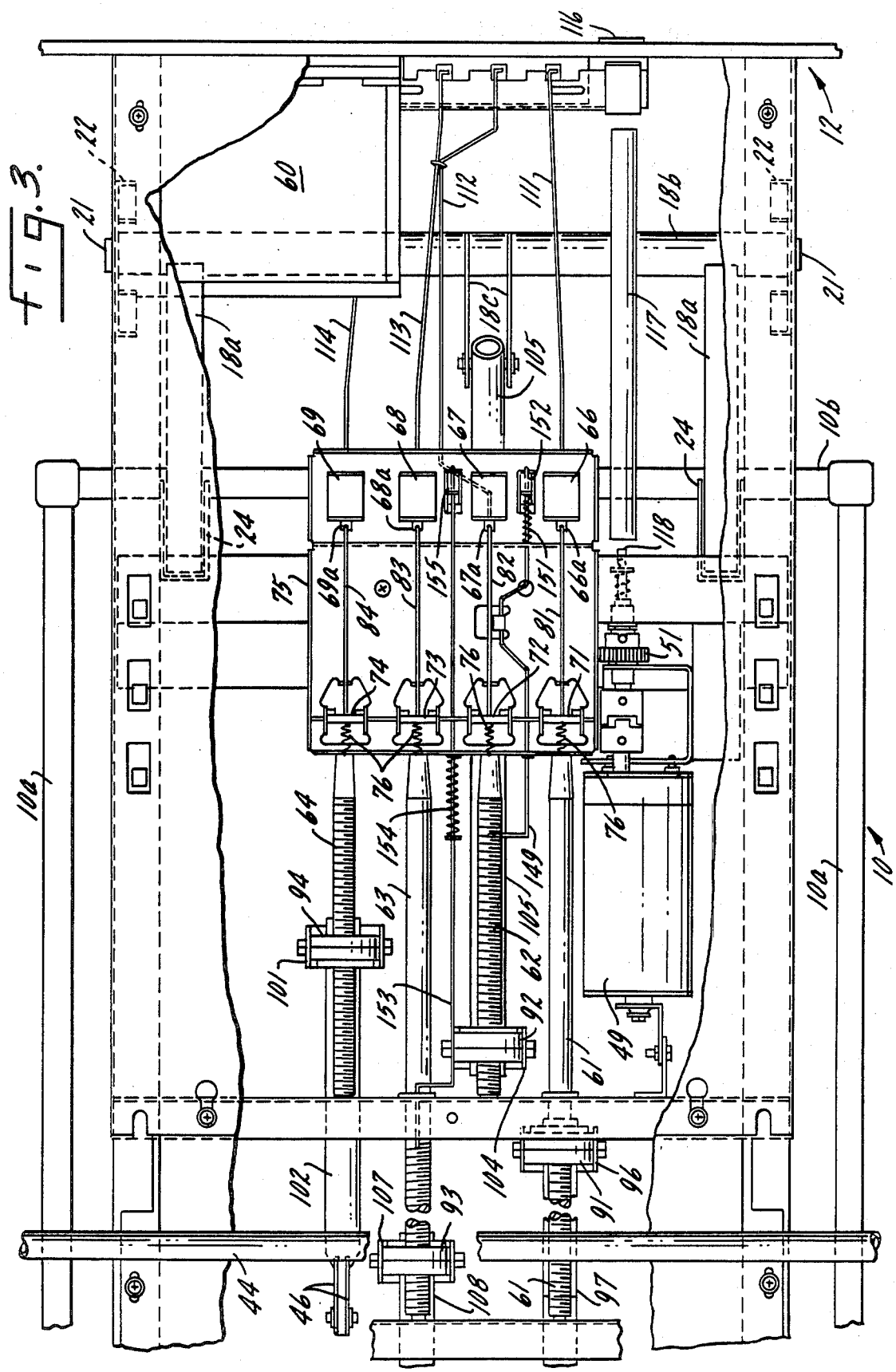

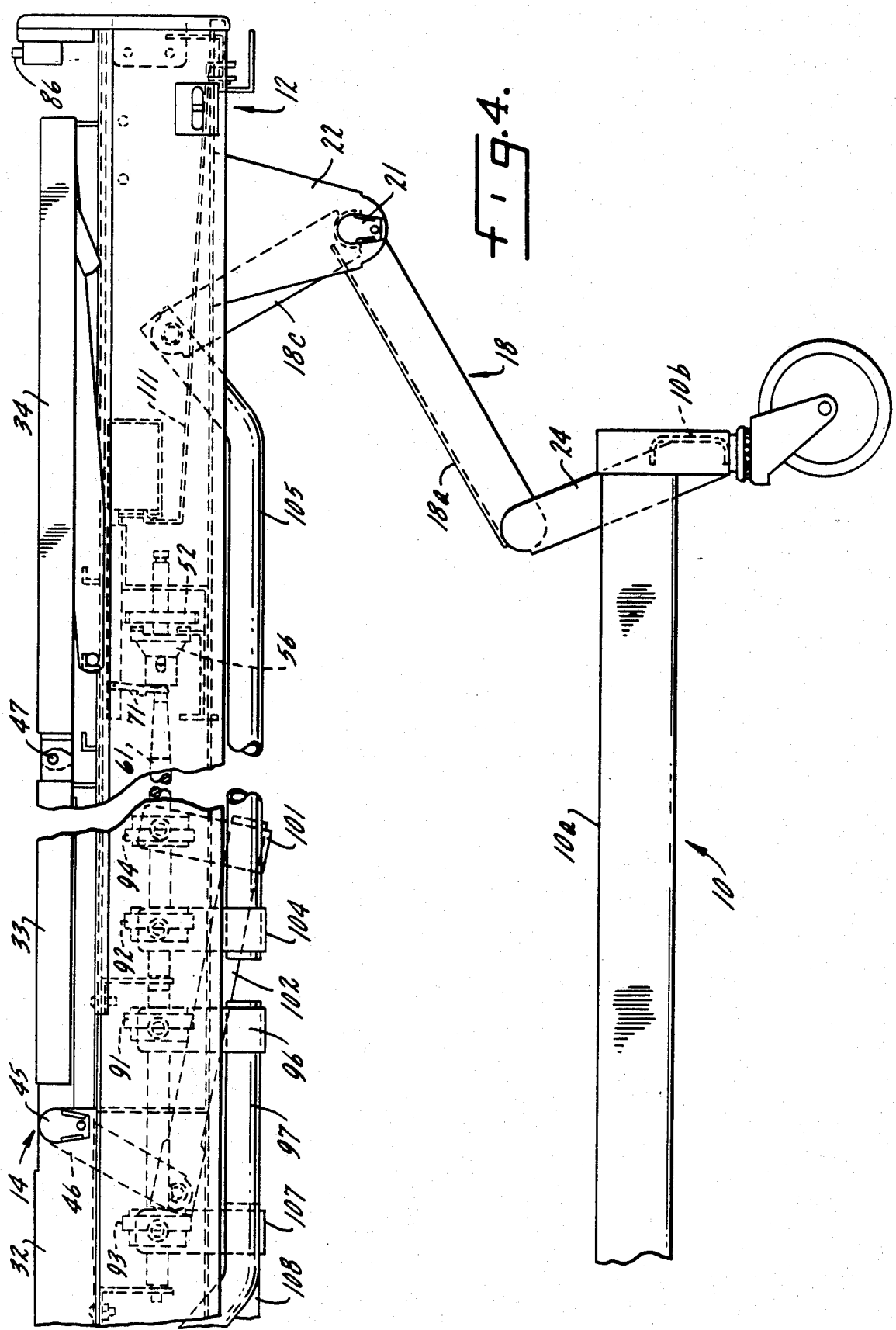

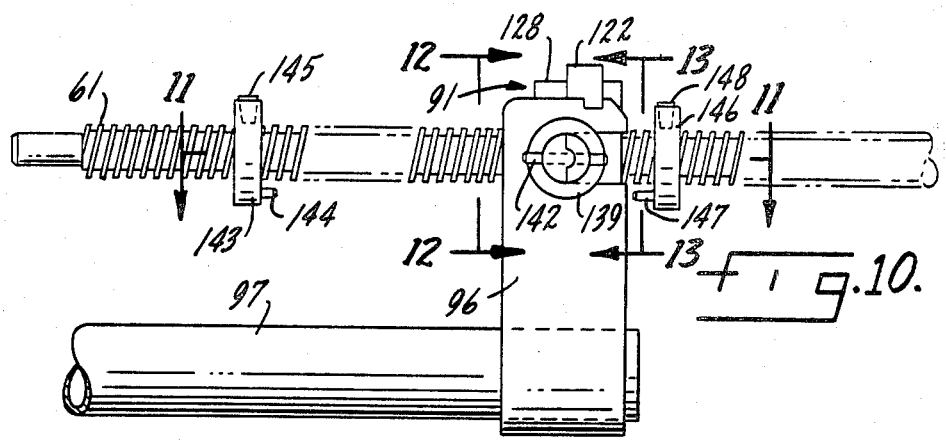
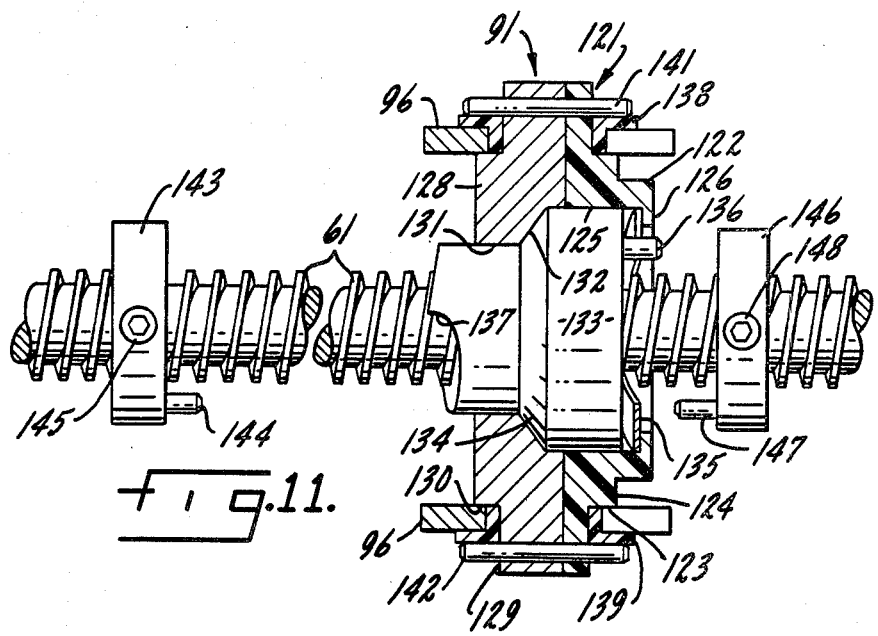
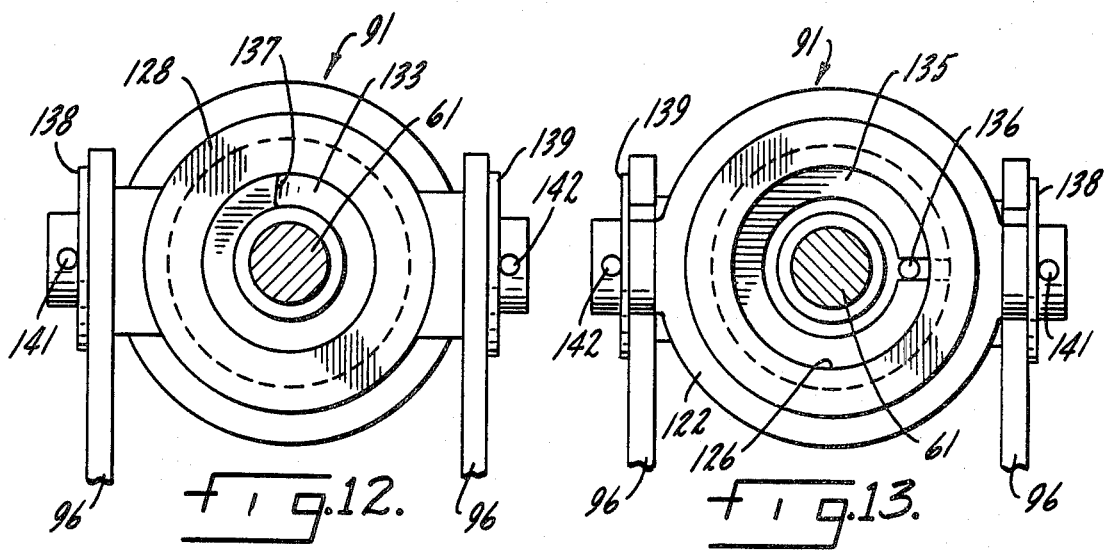

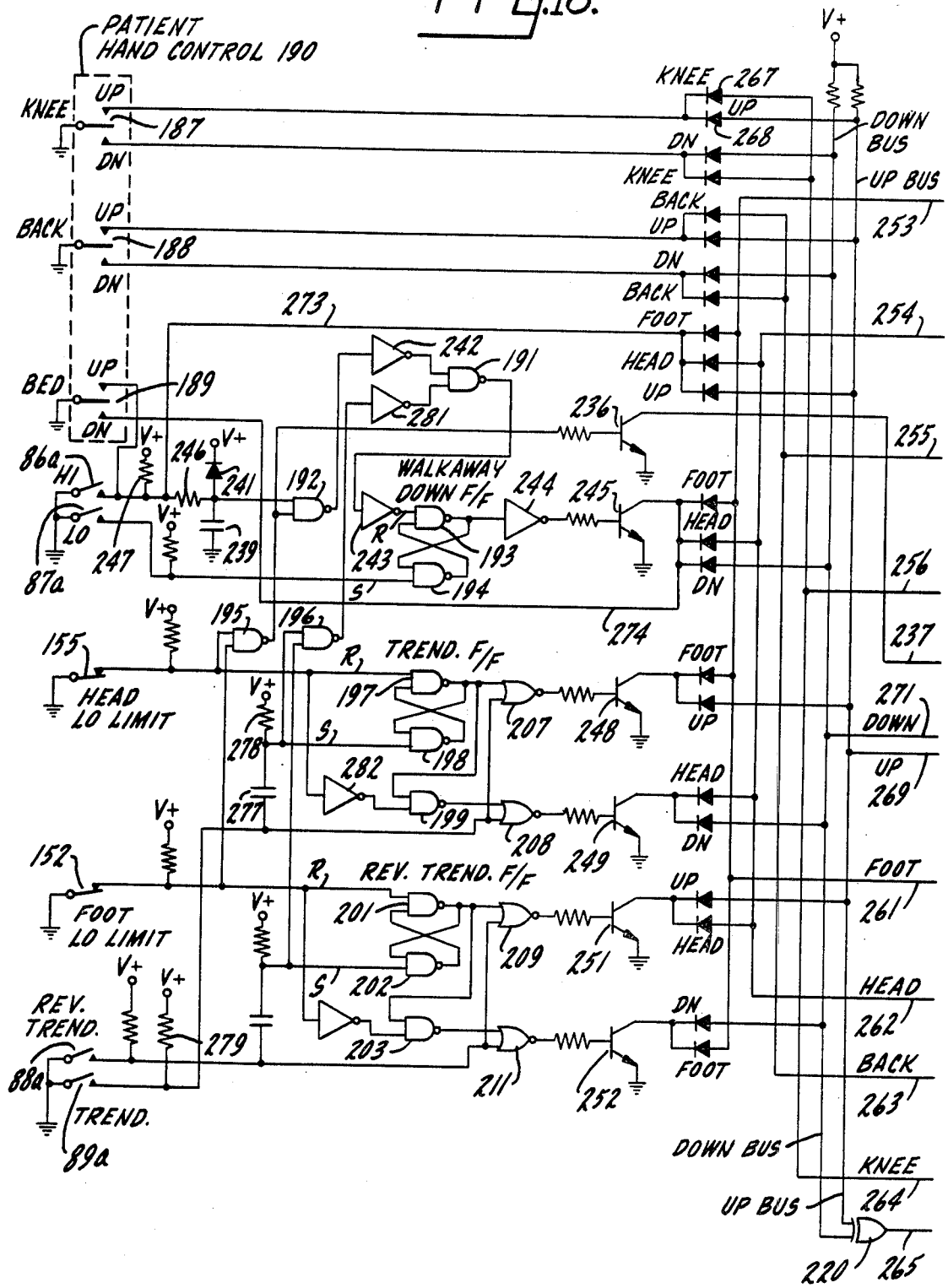

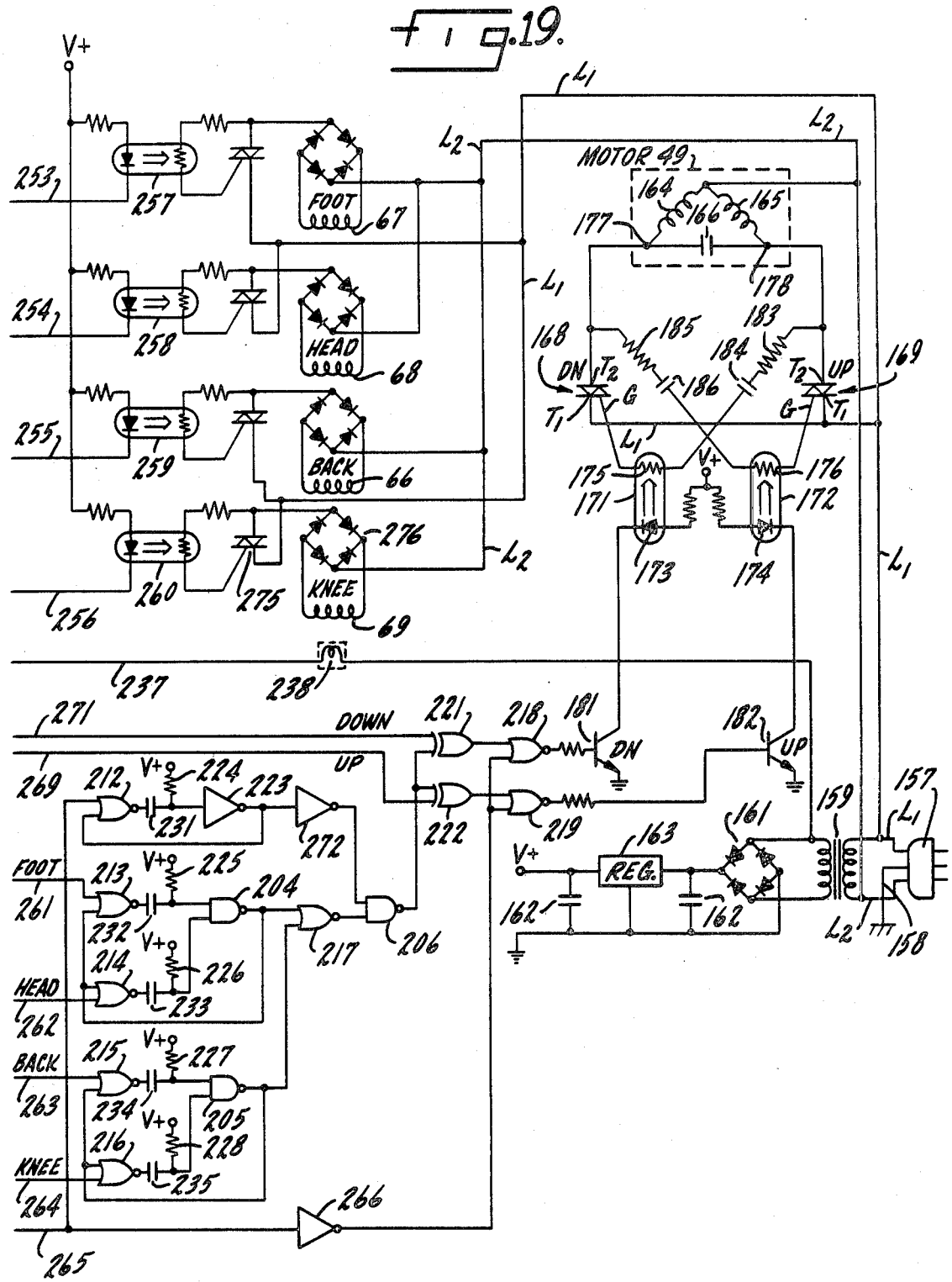

LATCHING SYSTEM FOR ADJUSTABLE MOTORIZED HOSPITAL BED

BACKGROUND OF THE INVENTION

This invention relates to an adjustable motorized hospital bed having independently actuable head and foot adjusting mechanisms for elevating and lowering each end of the bed independently of the other end. More particularly, the invention relates to a latching system for maintaining continuous operation of those adjusting mechanisms to lower both ends of the bed to their extreme lower limits, the bed being directly moved to that lowermost level from any tilted or level position.

Adjustable motorized hospital beds are usually vertically movable so that the mattress supporting structure may be established at a selected desired height, within a range of permissible heights, from the floor. To maximize the vertical adjustment range or travel in prior hospital beds, without sacrificing stability, the mattress supporting structure is customarily mounted on a movable upper frame which interconnects, via motor-driven head and foot adjusting mechanisms, to a fixed lower base frame located close to the floor. The adjusting mechanisms are actuated to either lift or lower the upper frame, and consequently the mattress supporting structure, as desired. The lowermost level of the movable frame is most convenient when a patient is entering or leaving the bed. On the other hand, the uppermost height is generally preferred for examination and treatment of the patient. To enhance the patient's comfort, the mattress support is divided into a series of individually adjustable sections or panels that may be positioned, by independently operable motor-driven adjusting mechanisms, to provide a desired contour or configuration.

Switch actuators or push buttons included in a hand-held control device, or mounted on the bed and accessible to the patient, permit the patient to remotely control various functions or adjustments of the bed to select a desired height and a desired configuration for the mattress supporting structure. Additional switch actuators are sometimes mounted on a control panel, called a "nurse station", at the bed's foot end to enable the nurse, doctor or attendant to conveniently control some of the adjustments that are controllable by the patient, plus other adjustments that should not be controllable by the patient. For example, the trendelenburg and reverse trendelenburg controls are usually located at the nurse station. When the trendelenburg control is actuated, the entire mattress supporting structure is tilted or canted to a trendelenburg position (head end down, foot end up) and when the reverse trendelenburg control is depressed the mattress support is tilted to a reverse trendelenburg position (head end up, foot end down). The bed is adjusted to a trendelenburg position when the patient goes into shock, whereas a reverse trendelenburg position is employed for drainage.

Preferably, the nurse station should include switch actuators or push buttons for controlling the high-low or height adjustment of the movable frame. The high-low switches, controllable by the patient, are of the momentary contact type which requires the patient to maintain continuous pressure on spring-biased switch actuators until the desired bed height is reached. For the most efficient operation, the low switch at the nurse station should not necessitate continuous actuation by the nurse. Quite often, and especially at night, the bed is vertically adjusted by the nurse to its lower position obtainable. As an important time-saving feature for the nurse, the extreme low limit should be reached merely by momentarily depressing a spring-biased switch actuator or push button.

Hospital bed latching systems have been developed which are latched or locked in a down operating mode, in response to the actuation of a momentary contact switch, to run the movable frame to its low limit. This is known as the "walkaway down" feature since the nurse can walk away and leave the hospital room as soon as the bed starts descending. In all of these prior hospital beds, however, the movable frame must first be placed at a horizontal level before it can then be lowered all the way down to its low limit. If the bed is even slightly tilted at the time the nurse wishes to use the walkaway down feature, she must initially actuate some appropriate control (such as an "out of trendelenburg" control or an "out of reverse trendelenburg" control) in order to level the bed and then she can depress the low switch actuator to lower the bed to its desired lowermost level. Complicated, and sometimes confusing, steps must therefore be taken by the nurse, or some other operator, and substantial time is required to manipulate such prior hospital beds to their lowermost level positions.

These shortcomings have now been overcome. By only simple steps by the nurse, the hospital bed of the present invention may be shifted immediately and directly to its lowermost level, irrespective of its position at the time and even though it may be tilted. In other words, the bed may be moved, from any level and from any tilted position, directly to its lowermost limit. Among other advantages, this results in a significant time saving when the nurse adjusts the bed.

SUMMARY OF THE INVENTION

The adjustable hospital bed of the present invention comprises a movable frame, having head and foot ends, and independently actuable head and foot adjusting mechanisms for raising and lowering the head and foot ends, respectively, of the movable frame. Independently operable head and foot drive means are provided for actuating the head and foot adjusting mechanisms, respectively, to adjust the height of each end of the movable frame independently of the other end. Finally, the adjustable hospital bed comprises a latching system which, in response to a momentary down command, operates the head and foot drive means to lower each end of the movable frame directly to its lowermost level regardless of the frame's position, and even though the frame may be tilted, at the time the command is issued.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like elements, and in which:

FIG. 1 is a side view of an adjustable motorized hospital bed constructed in accordance with the invention, the bed being illustrated with independently operable head, foot, back and knee adjusting mechanisms placing the bed in a normal horizontal position (the movable frame and mattress support thereby being horizontal)

Figure 5:
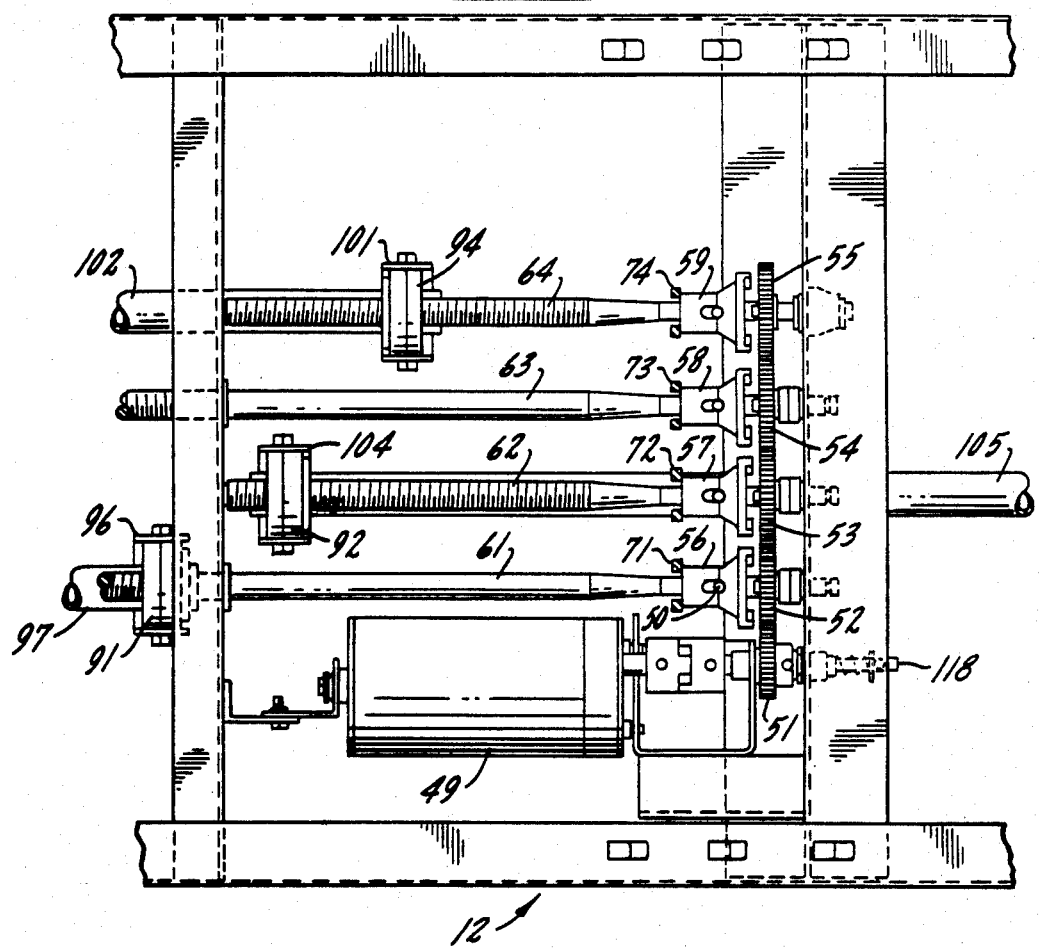
Figure 6:
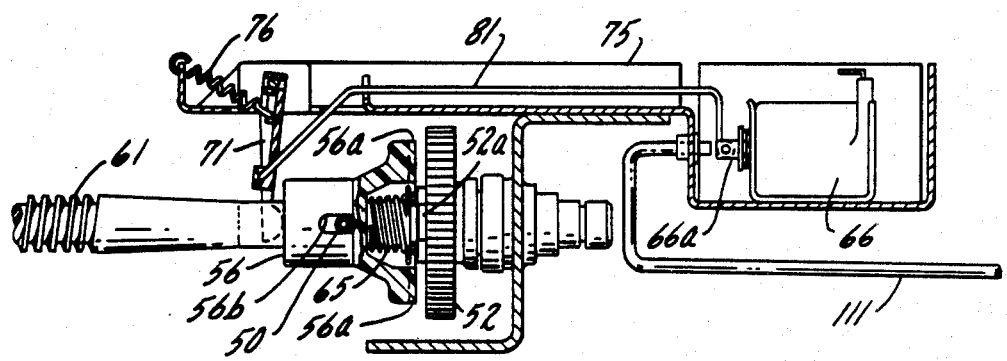
Figure 7:
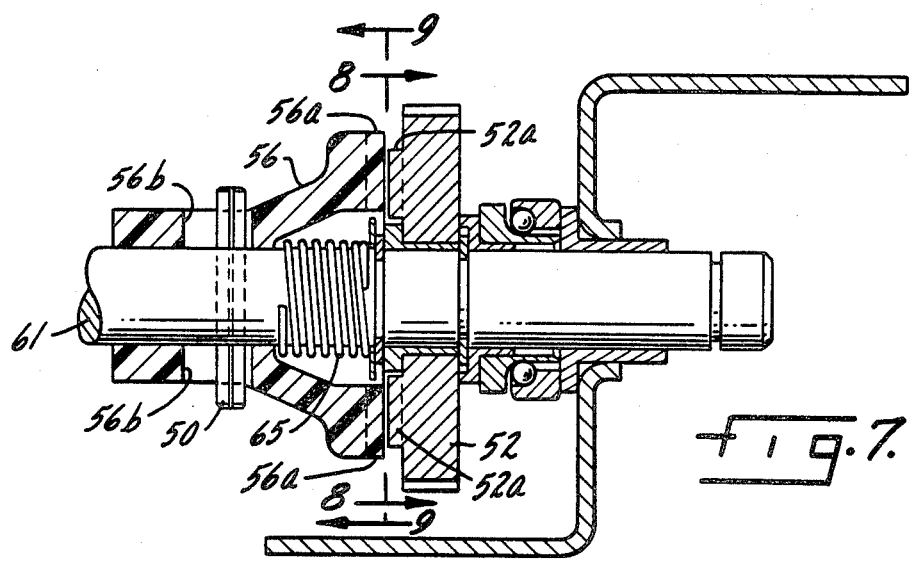
Figure 8:
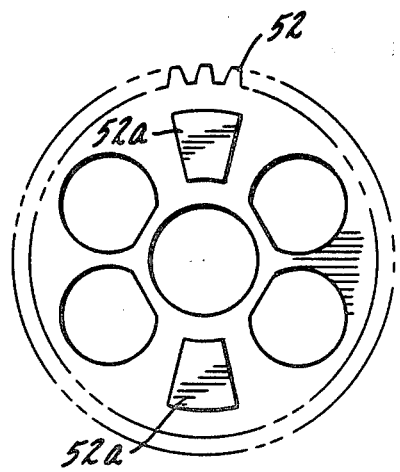
Figure 9:
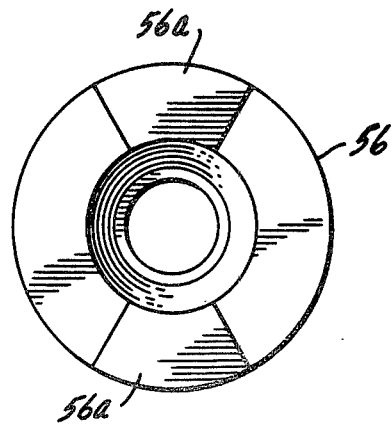
Figure 14:
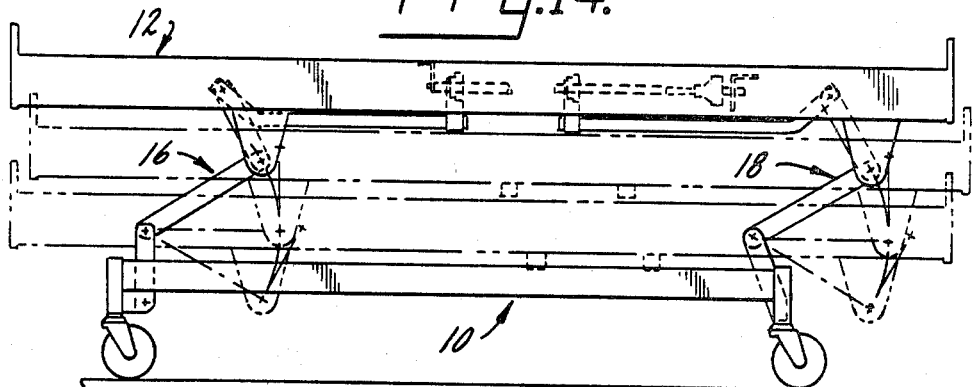
Figure 15:
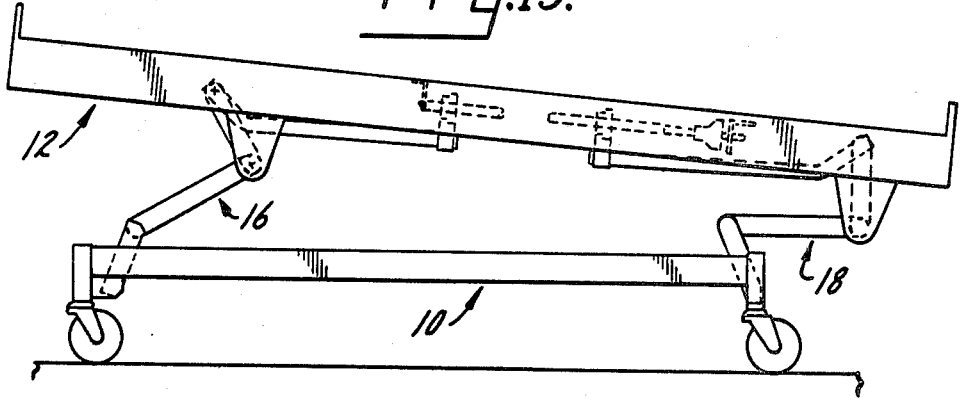
Figure 16:
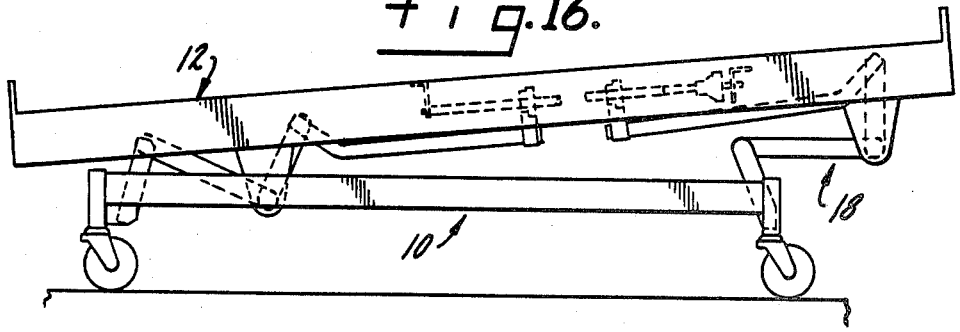
Figure 17:
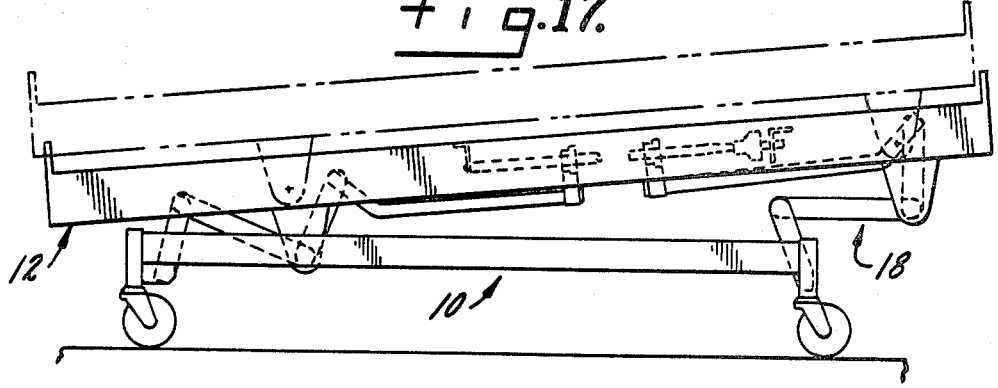

with the head end on the left and the foot end on the right;

FIG. 2 is a view of the foot end of the bed of FIG. 1;

FIG. 3 is a fragmentary and partially broken away top or plan view of the bed of FIG. 1 on an expanded scale and illustrates drive screws for operating the adjusting mechanisms;

FIG. 4 is a fragmentary side view of the bed showing the side view of some of the parts illustrated in FIG. 3 and on the same scale as FIG. 3;

FIG. 5 is a fragmentary top view showing some of the parts hidden in the FIG. 3 view, the figure illustrating clutches for coupling a common reversible motor drive to the drive screws for the adjusting mechanisms;

FIG. 6 is a fragmentary side view, partially in section, of some of the elements of FIGS. 3 and 5 (including one of the clutches) on an expanded scale;

FIG. 7 is a more detailed illustration of a portion of the structure shown in FIG. 6 and more clearly shows the manner in which the clutch may be engaged and disengaged;

FIG. 8 is a sectional view taken along the plane of section line 8—8 in FIG. 7;

FIG. 9 is a sectional view taken along the plane of section line 9—9 in FIG. 7;

FIG. 10 is a fragmentary side view of a drive screw and an associated drive mechanism which travels along the drive screw, when the screw is rotated, and actuates the associated bed adjusting mechanism;

FIG. 11 is a fragmentary and enlarged view, partially in section taken along the plane of section line 11—11 in FIG. 10, showing the drive screw and drive mechanism of FIG. 10;

FIG. 12 is a sectional view taken along the plane of section line 12—12 in FIG. 10;

FIG. 13 is a sectional view taken along the plane of section line 13—13 in FIG. 10;

FIG. 14 illustrates the vertical movement of the bed when the movable frame is horizontal and when both the head and foot adjusting or lifting mechanisms are actuated simultaneously;

FIG. 15 depicts the manner in which the bed may be tilted to the reverse trendelenburg position (head end up, foot end down) when only the head adjusting mechanism is operated;

FIG. 16 shows the foot adjusting mechanism in the same position as in FIG. 15, but the head adjusting mechanism has been actuated so that the bed is tilted in the other direction to the trendelenburg position (head end down, foot end up);

FIG. 17 illustrates the manner in which the movable frame may be elevated or lowered while it is tilted; and FIGS. 18 and 19 together schematically illustrate logic circuitry for controlling the operation of the head, foot, back and knee adjusting mechanisms and for controlling the direction of motor rotation. Of course, FIG. 19 should be placed immediately to the right of FIG. 18 to display the complete control circuit.

DESCRIPTION OF THE ILLUSTRATED EMBODIMENT

The disclosed hospital bed includes a stationary or fixed lower base frame 10 (see particularly FIGS. 1, 2 and 4), and a movable upper frame 12 on which is mounted an articulated mattress supporting structure 14. Frame 10 has a pair of longitudinal bars or rails 10a with a pair of transverse or cross bars 10b at the foot and head ends. Movable frame 12 is supported on and is vertically adjustable with respect to fixed frame 10 by means of head and foot adjusting or lifting mechanisms 16, 18, respectively, which together provide a parallelogram lifting system. It will be apparent, however, that the invention may be employed with other lifting systems, such as a trapezoidal system. Adjusting mechanism 18 takes the form of a lift yoke having a pair of channel shaped long lever or lift arms 18a rigidly affixed to a pivot or torque tube 18b (see FIG. 2) which in turn is pivotally attached, by means of pivot studs 21, to a pair of brackets or lift support plates 22 rigidly secured to upper frame 12. The lift yoke also includes a pair of short lever arms 18c rigidly affixed to pivot tube 18b. The lower or free end of each lever arm 18a pivotally connects to a pair of brackets 24 rigidly affixed to the cross bar 10b at the foot end of base frame 10. It should be apparent that by moving the free or upper ends of short lever arms 18c to the right, as viewed in FIGS. 1 and 4, to effect clockwise rotation of yoke 18 around pivot studs 21, brackets 22 and consequently the foot end of upper frame 12 will be lowered. On the other hand, if lever arms 18c are moved to the left to rotate yoke 18 in a counterclockwise direction, brackets 22 and the foot end of frame 12 will be raised.

Although the drawings do not include an end view of the head end of the bed, it will be understood that head adjusting mechanism 16 takes the form of a lift yoke of similar construction to yoke 18, having a pair of long lever arms 16a rigidly secured to a pivot or torque tube to which is also rigidly affixed a pair of short lever arms 16c. By means of a pair of pivot studs 25, the pivot tube is rotatably mounted to a pair of lift support plates or brackets 26 rigidly secured to frame 12. The lower or free ends of lever arms 16a are pivotally coupled to the upper ends of brackets 27, the lower ends of the brackets being pivotally attached to frame 10 by means of pivot studs 28. In similar fashion to the operation of yoke 18, when the upper ends of lever arms 16c are moved to the right (as viewed in FIG. 1) yoke 16 rotates clockwise around pivot studs 25 causing brackets 26 and the head end of upper frame 12 to descend. Conversely, when lever arms 16c are moved to the left, counterclockwise rotation results and the head end of frame 12 moves upwardly. The lower ends of brackets 27 are pivotally coupled to base frame 10 by studs 28 to allow the bed to assume the various positions shown in FIGS. 14-17.

Articulated mattress supporting structure 14 is divided into four interconnected sections or panels, namely a back support section 31, a center or seat support section 32, an upper knee or thigh support section 33, and a lower knee or foot section 34. Each of the four support sections preferably takes the form of a perforated metal panel, but of course other constructions could be employed. For example, each mattress support section may constitute a bed spring. Seat support section 32 is rigidly affixed to frame 12, while one side or edge of back support section 31 is pivotally connected, by means of a pair of pivot studs 36 (only one of which is shown in FIG. 1), to seat support section 32. As will be described, an adjusting mechanism is provided for tilting back section 31 upward, with respect to fixed seat section 32, to raise the back and head of the patient occupying the bed to maximize comfort. The tilting is achieved by a torque or pivot tube 39 (see FIG. 1) secured to back section 31 by rigid structural members 41 and 42. A pair of lever arms 43 (only one of which is shown in FIG. 1) are rigidly affixed to tube 39 in order to facilitate turning of the tube. As the free ends of lever arms 43 are moved to the left, as viewed in FIG. 1, tube 39 rotates in a clockwise direction thereby tiling back support section 31 upward.

The adjacent sides of knee support sections 33 and 34 are pivotally interconnected by a pair of pivot studs 47, only one of which is shown in FIGS. 1 and 4. The left side of section 33 (as viewed in FIGS. 1 and 4) rigidly attaches to a torque or pivot tube 44 (see FIG. 3) which is rotatably mounted to seat support section 32 by pivot studs 45, only one of which is seen in FIGS. 1 and 4. A pair of lever arms 46 (see FIGS. 1, 3 and 4) are rigidly secured to torque tube 44 so that movement of the free ends of those arms toward the right (as viewed in FIGS. 1 and 4) results in counterclockwise pivoting of tube 44 around pivot studs 45. Upper knee support section 33 therefore tilts upward and since that section is pivotally connected to lower knee support section 34 by studs 47, the left side of section 34 will be raised. Sections 33 and 34 will thus form an inverted V in order to raise the patient's knees. An adjusting mechanism will be described for pivoting lever arms 46 to effect a desired knee adjustment to maximize the patient's comfort.

The movable members 16, 18, 31, 33 and 34 may all be actuated, either individually or collectively, by a single reversible or bidirectional electric a-c motor 49 (see FIGS. 3 and 5) supported on upper frame 12. When energized, motor 49 drives gear 51 which in turn rotates the four intercoupled driven gears 52-55. Each of the gears 52-55 couples, via a respective one of four clutches 56-59, to a respective one of four screw-threaded output drive shafts or drive screws 61-64, screws 61, 62 and 64 having left-handed threads while screw 63 has right-handed threads. Clutches 56-59, preferably made of plastic, are normally spring biased out of engagement with their respective gears 52-55. The gears and clutches have dogs or lugs which interlock or mesh when engaged in order that gear rotation will be transferred to the associated drive screw. Attention is directed particularly to FIGS. 6-9 which illustrate, in greater detail, the construction of clutch 56 and the apparatus for controlling it. Of course, since all of the clutches 56-59 are of similar construction only one is shown in FIGS. 6-9 and the explanation of its construction and operation applies to all of the other clutches.

Note that clutch 56 and gear 52, as illustrated in FIGS. 7-9, are shifted or rotated 90° from their positions as shown in FIG. 6. This is particularly evident by observing the position of pin 50 which is fixed to, and perpendicular to the axis of, drive screw 61. Pin 50 extends through the two slots 56b in clutch 56 and guides the movement of the clutch as it moves between its engaged and disengaged positions. The spring biasing of clutch 56 is accomplished by coil spring 65 which pushes the clutch to the left and out of engagement with gear 52, thereby to separate the mating surfaces. The two projecting lugs 52a on gear 52 (see particularly FIG. 8) mesh with the two projecting or raised lugs 56a on clutch 56 (see particularly FIG. 9) when the clutch is moved to the right and into its engaged position. Relatively light springs may be used for the restoring springs 65. Each spring 65 will be capable of disengaging or releasing its associated clutch by exerting a force of only a few ounces on the clutch. The manner in which this is accomplished will be described hereinafter.

Each of clutches 56-59 is actuated into engagement with its associated gear by a respective one of four solenoids 66-69 (see FIG. 3) which actuate U-shaped yokes 71-74, respectively. For reasons to be understood, solenoid 66 may be called the "back solenoid", solenoid 67 the "foot solenoid", solenoid 68 the "head solenoid", and solenoid 69 may be called the "knee solenoid". Each of yokes 71-74 is pivotally connected to support pan 75 (mounted on frame 12) and straddles a respective one of drive screws 61-64 and abuts the screw's clutch. Coil springs 76 bias the free ends of yokes 71-74 so that minimal pressure is normally applied to the clutches by the yokes. Actuation of each yoke in response to energization of its associated solenoid is achieved by means of linkages or rods 81-84 each of which connects a respective one of yokes 71-74 to a respective one of movable cores 66a-69a of solenoids 66-69, respectively. This construction is clearly illustrated in FIG. 6.

When reversible motor 49 is rotating in one of its two directions, thereby rotating all of gears 52-55, and a selected solenoid is energized, the yoke associated with the solenoid will be pulled to the right, as viewed in the drawings, to actuate or move its clutch into engagement with its associated one of gears 52-55, thereupon causing rotation of the associated drive screw in response to the gear rotation. In short, anytime motor 49 is energized, all of gears 52-55 will be rotating and by energizing a selected one or more of solenoid 66-69 a corresponding selected one or more of drive screws 61-64 will be rotated. Of course, the rotational directions of the drive screws will depend on the direction of motor 49, but since that motor is reversible it is possible to rotate each of the screws 61-64 in either of its two directions.

Since each clutch is normally held disengaged by means of a relatively small restoring spring 65, actuation of the clutch to engage the mating lug surfaces may consequently be achieved by a relatively small solenoid. The force produced by the solenoid need only be slightly greater than the spring force in order to overcome that spring force and shift the clutch into its engaged position. The need for only a small solenoid and clutch restoring spring to accomplish clutch actuation and de-actuation in a hospital bed provides efficient and reliable operation, and lowers the cost, power consumption and noise. In a manner to be explained, such clutch operation is achieved by unloading each clutch, that should be disengaged or de-actuated, from any tangential forces or torque that would otherwise tend to hold or "bind" the mating lug surfaces locked together even after the associated solenoid has been de-energized. To explain, after a clutch has been engaged and the associated adjusting mechanism is operated to obtain a desired bed adjustment, the clutch will tend to remain in the engaged position even after the motor stops rotating and the associated solenoid is de-energized. This occurs because the weight of all the apparatus connected to the associated drive screw applies a torque to the clutch which holds or locks the mating lug surfaces pressed together so that they cannot separate and disengage. The friction between the lugs on the clutch and the lugs on the associated gear will be so great that a very strong coil spring 65 would usually be needed to move the clutch out of engagement. In a manner to be described, however, any torque or tangential pressure on the clutch is momentarily removed to decrease the friction between the mating lug surfaces to allow the clutch to move freely along the axis of its associated drive screw under the very small force of its restoring spring 65. Relatively little pressure will be required to push the clutch back to its disengaged position. As will be seen, unloading of a clutch from torque to eliminate the friction between the lug surfaces, thereby to permit the clutch to slide back to its released position, is accomplished by momentarily reversing the direction of rotation of bidirectional motor 49. This slight counterrotation jogs the gear train sufficiently to take the forces off of the clutch so that it can release.

The logic circuitry of FIGS. 18 and 19 may be employed to control the energization of motor 49 and of solenoids 66–69, in accordance with the present invention, to achieve actuation of drive screws 61–64 and to position the bed as shown in FIGS. 14–17. The logic circuitry may be controlled by switches that are operated by switch actuators mounted somewhere on the bed or in a patient hand control device that may be held by the patient and/or removably attached to the bed, such as to one of the bed's restraining sides or side guards. Among other prior disclosures, one such hand control unit for remotely controlling the circuitry for a bed is shown in U.S. Pat. No. 3,921,048, issued Nov. 18, 1975 to Kenneth W. Padgitt. Switch actuators should be conveniently accessible for any operator (be it the patient, nurse, doctor, attendant, etc.) to control the head, foot, back and knee adjustments or functions. In other words, the operator-controlled switches should control the energization of solenoids 66–69, while at the same time controlling the direction of motor rotation. As will be appreciated when the circuitry of FIGS. 18 and 19 is discussed, the patient operated controls are included in a hand control unit that may be held by the patient and is cable connected to the rest of the circuitry.

The four manually operated switch actuators or push buttons 86–89 (see FIG. 2) are mounted at a nurse station at the foot end of upper frame 12 and are provided for the convenience of the doctor, nurse or attendant and control switches in FIG. 18. As will be made apparent, by momentarily depressing push button 87 a latching system may be latched in a down operating mode to lower the frame 12 directly to its lowermost level regardless of its position at the time and even though the frame may be tilted. Most of the logic circuitry of FIGS. 18 and 19 may be mounted on a printed circuit board which is supported on the upper frame in the general area indicated by the reference number 60 in FIG. 3.

The rotational motion of screws 61–64 is converted to linear motion by the four drive mechanisms 91–94, respectively, the movements of which cause adjustment of the bed. Attention is directed to FIGS. 10–13 which show in detail the construction of drive mechanism 91. Of course, the other three drive mechanisms 92–94 are of similar construction and operate in similar manner, so only drive mechanism 91 will be described. It includes a two-piece brake housing 121 surrounding drive screw 61. Housing piece 122 is preferably made of an injection molded thermoplastic resin and is provided with shoulders 123 and 124, an opening 125 and a lip 126. The other housing piece 128 is preferably made of metal and has shoulders 129 and 130 and an opening 131 having a radially extending, tapered brake surface 132 thereon. A brake nut 133 is contained in the openings 125 and 131 of the housing pieces 122, 128, respectively. Brake nut 133 threadedly engages the drive screw 61 and is adapted to be driven thereby. The brake nut contains a radially extending, tapered brake surface 134. A spring in the form of a thrust washer 135 is retained within the lip 126 and yieldingly urges the brake nut 133 to the left as seen in FIG. 11 to force the brake surfaces 132 and 134 into engagement. A stop pin 136 is secured to one end of the brake nut 133 and a stop surface 137 is provided on the other end of the nut. The two pieces 122 and 128 of housing 121 are secured together by a pair of sleeves 138 and 139 and a pair of cotter pins 141 and 142. The linkage or bracket 96 is pivotally coupled to the brake housing 121 by the sleeves 138 and 139 and the cotter pins 141 and 142. Stop collar 143, containing a stop pin 144, surrounds and is fixedly secured to drive screw 61 by an allen screw 145. A second stop collar 146, containing a stop pin 147, is similarly fixedly secured to the drive screw 61 by an allen screw 148.

As drive screw 61 rotates, the brake nut 133 and housing 121 will travel linearly and axially along the screw. Stop collars 143 and 146 are provided on drive screw 61 to define the limits of travel of drive mechanism 91, the collars rotating with the drive screw. When the drive mechanism 91 travels along the drive screw 61 to a limit of travel established by one of the collars 143, 146, the stop 136 or the stop 137 of the nut 133 will engage one of the pins 144, 147 of the collars and the linear travel of the drive mechanism will be terminated even though the drive screw 61 continues to rotate. Assume, for example, that drive mechanism 91 has traveled to the left in FIGS. 10 and 11 until pin 144 on collar 143 engages stop surface 137. When that occurs, pin 144 will rotate the brake nut 133 within housing 121 to overcome the frictional engagement of the brake surfaces 132 and 134, the nut thereby free-wheeling, as drive screw 61 rotates. The housing 121, and consequently the drive mechanism 91, therefore remain axially stationary on the rotating drive screw 61. Thus, continued rotation of drive screw 61 after its drive mechanism 91 has reached a limit of travel results in no axial movement of the drive mechanism.

Of course, each of the other three drive screws 62–64 has a pair of similar stop collars fixedly secured thereto to define the limits of travel of the associated drive mechanism. Arresting the axial travel of each drive mechanism when a limit is reached, even though the associated drive screw may still be rotating, precludes the need for electrical switches to de-energize the motor 49 when the various bed adjustments reach their extreme positions. The eight stop collars (like collars 143 and 146) are not shown in FIGS. 1–6 to avoid unduly encumbering the drawings.

Bracket 96, which is pivotally coupled to drive mechanism 91, is rigidly affixed to a tube 97 which in turn is pivotally connected to the free ends of lever arms 43. When drive screw 61 is rotated in the direction which causes drive mechanism 91 to move linearly to the left (as viewed in the drawings), arms 43 and torque tube 39 will be rotated in a clockwise direction and back support section 31 will be tilted upward. Opposite rotation of drive screw 61 will lower section 31 from its tilted position. Screw 61 may thus be referred to as the "back drive screw". In similar fashion, drive mechanism 94 pivotally connects to linkage or bracket 101 which is rigidly secured to one end of a tube 102. The other end is pivotally coupled to the free ends of lever arms 46 in order that rotation of drive screw 64 (which may be called the "knee drive screw") will rotate tube 44 to raise or lower the knee support sections 33 and 34.

Movement of drive mechanism 92 results in actuation of foot adjusting mechanism 18 to raise or lower the foot end of upper frame 12, depending on the rotational direction of drive screw 62, referred to as the "foot drive screw". More specifically, the brake housing of drive mechanism 92 is pivotally coupled to a bracket or linkage 104 which rigidly connects to one end of a tube 105, the other end of which pivotally connects to lever arms 18c. When foot drive screw 62 is rotated in the direction to move drive mechanism 92, and consequently tube 105, to the left in the drawings, lever arms 18c will be rotated in a counterclockwise direction causing the foot end of frame 12 to raise. Conversely, opposite direction rotation of screw 62 moves the drive mechanism to the right and this results in clockwise rotation of adjusting mechanism 18 and lowering of the upper frame's foot end. Motor 49, gears 51, 52 and 53, clutch 57, drive screw 62 and drive mechanism 92 may therefore be considered the "foot drive means" for actuating the foot adjusting mechanism 18 to adjust the height of the upper frame's foot end. When the foot end is lowered to its lowermost level, drive mechanism 92 engages and pushes rigid wire or rod 149 to the right (see FIG. 3) against the force of biasing coil spring 151 and actuates switch 152. Rod 149, spring 151 and switch 152 are supported by pan 75. Switch 152 is called the "foot low limit switch" and its function will be described later in connection with the logic circuitry in FIGS. 18 and 19. Briefly, switch 152 is normally closed (as shown in FIG. 18) when the foot end of frame 12 is at any level other than its lowermost level. When the foot end is dropped to its lowermost limit, drive mechanism 92 pushes rod 149 to the right in FIG. 3 and this causes switch 152 to open. Of course, when the foot end is off or above its low limit and drive mechanism 92 has moved to the left and away from engagement with rod 149, coil spring 151 will restore the rod to its normal position as shown in FIG. 3 and switch 152 will return to its closed position.

The head adjusting mechanism 16 functions in similar manner to effect independent raising and lowering of the head end of frame 12. Drive mechanism 93 is pivotally coupled to linkage or bracket 107 which ridigly attaches to one end of a tube 108, the other end being pivotally coupled to the free ends of lever arms 16c. When drive screw 63 (called the "head drive screw") rotates in the direction required to move drive mechanism 93 to the left, tube 108 will cause counterclockwise rotation of adjusting mechanism 16 with resultant raising of the head end of frame 12. On the other hand, opposite direction rotation of head drive screw 63 causes drive mechanism 93 to travel to the right, thereby effecting clockwise rotation of adjusting mechanism 16 and lowering of the frame's head end. Motor 49, gears 51, 52,53 and 54, clutch 58, drive screw 63 and drive mechanism 93 may thus be called the "head drive means" for actuating the head adjusting mechanism 16 to adjust the height of the upper frame's head end. When the head end of frame 12 is lowered to its lowermost level, drive mechanism 93 engages and pushes rigid wire or rod 153 to the right (FIG. 3) against the biasing force of coil spring 154 and actuates switch 155, the "head low limit switch". Rod 153, spring 154 and switch 155 are supported by pan 75. Switch 155 is also closed (see FIG. 18) when the head end is off of or above its low limit and drive mechanism 93 is out of engagement with rod 153. When the head end is all the way down and rod 153 is pushed to the right, normally-closed switch 155 will open.

It will now be apparent that since each of the adjusting mechanisms 16 and 18 and its driving apparatus is entirely independent of the other adjusting mechanism and its driving apparatus, the head and foot ends of upper frame 12 may each be positioned at any selected level or height, as a consequence of which frame 12 may be made horizontal or tilted and may be established at any desired level. This flexibility in operation is clearly illustrated in FIGS. 14–17. FIG. 14 depicts the operation of the bed when upper frame 12 is horizontal and both of drive screws 62 and 63 are rotating simultaneously or collectively, thereby elevating and lowering the frame in its horizontal position. When the foot drive screw 62 is not rotated but the head drive screw 63 is, the head end of frame 12 may be raised, as shown in FIG. 15, to establish the bed in the reverse trendelenburg position. FIG. 16 shows the action when the foot end of frame 12 remains at the same height as in FIG. 15 and the head drive screw 63 is rotated in the opposite direction to lower the upper frame's head end to place the bed in the trendelenburg position. FIG. 17 illustrates the operation when, starting from the tilted position of FIG. 16, drive screws 62 and 63 are rotated simultaneously, thereby elevating the entirety of frame 12 while it is tilted.

Hence, frame 12 can be tilted at any height and the height may be changed while at any tilt angle. Also the tilt angle may be changed by raising or lowering either end of frame 12 thus obtaining a desired tilt angle without changing the height of one end. Of course, the head and foot adjusting mechanisms are independently operable even when the back support section 31 and the knee support sections 33 and 34 are tilted relative to seat section 32. As will be made apparent when discussing the logic circuitry of FIGS. 18 and 19, a latching system is provided which, in response to a momentary down command issued by the nurse by depressing switch actuator 87, controls the operation of the head and foot drive means to lower each end of frame 12 directly to its lowermost level irrespective of the frame's position, and even though the frame may be tilted, at the time the command is issued. Moreover, since all four drive screws 61–64 are independently rotatable and may be rotated individually, collectively or in any combination, several different bed adjustments may be made simultaneously, thereby saving considerable time. For example, back support section 31 may be raised at the same time that knee support sections 33 and 34 are being raised. If desired, the bed height may also be changed while the back and knee sections are being adjusted. As another example, sections 31, 33 and 34 may all be lowered simultaneously and made coplanar while at the same time the mattress support 14 is being tilted to the trendelenburg position. And all of this concurrent action is produced by a single common drive, namely reversible motor 49.

Of course, by the proper selection of the thread directions of drive screw 61 and 64, back support section 31 and knee support sections 33 and 34 may be adjusted in a desired direction at the same time that upper frame 12 is moving in a given predetermined direction. For example, it may be desirable to lower all of sections 31, 33 and 34 to their horizontal positions (shown in FIG. 1) as frame 12 is simultaneously being raised. This would expedite the establishment of the bed in the preferred patient examination position. In the disclosed embodiment of the invention, however, the thread directions of the drive screws are chosen so that all of the adjusting mechanisms (if simultaneously operated) will go up at the same time and down at the same time. In other words, if the motor is running in one direction and all of the adjusting mechanisms are turned on at the same time, the back and knee support sections and the head and foot ends of the bed will all go up or raise at the same time. Conversely, when the motor is rotated in the other direction and all of the adjusting mechanisms are operated, the back and knee support sections and the head and foot ends will go down or descend simultaneously. Such an arrangement renders it easier for the patient to adjust the bed. It is easier for the patient to remember that everything goes up at the same time, if all of the patient-controlled switches are actuated, and everything goes down at the same time. Since each of the two motor directions is associated with a specific adjusting direction, for convenience the motor directions will be referred to as the "up direction" and the "down direction".

In the event of a power failure, thereby precluding the operation of reversible motor 49 and solenoid 66–69, linkages in the form of relatively rigid wires or rods 111–114 are provided to allow the doctor, nurse or attendant to mechanically depress the cores of the solenoids from the foot end of the bed. This is clearly seen in FIG. 6. By pulling linkage 111 to the right in FIG. 6, core 66a of solenoid 66 is pushed to the right and into the solenoid winding in the same manner as if the solenoid had been energized electrically. Gears 52–55 may then be driven by inserting a hand crank (not shown) through opening 116, at the foot end of frame 12 (see FIGS. 2 and 3), and then through tube 117, mounted on frame 12, for engagement with shaft 118 which is coupled to driving gear 51. By hand cranking shaft 118, gear 51 may be rotated to in turn rotate gears 52–55 in the same fashion as if motor 49 was rotating. Hence, by manipulating selected ones of linkages 111–114 and by hand cranking shaft 118 all of the bed adjustments may be made.

It should be appreciated that the high-low lifting mechanisms may take different forms. While a parallelogram lifting system is employed in the illustrated embodiment for the high-low adjustment, other systems, such as a trapezoidal lifting system, could be used. In the illustrated parallelogram lift, the head and foot drive mechanisms travel in the same linear direction when the upper frame is being raised or lowered. With a trapezoidal lift, the two drive mechanisms would be moving in opposite directions when the upper frame is being elevated or lowered.

Consideration will now be given to the logic circuitry, schematically shown in FIGS. 18 and 19, for controlling solenoids 66–69 and motor 49 in accordance with the present invention. Three-pronged plug 157 is adapted to plug into a conventional grounded wall outlet, in the hospital room where the disclosed adjustable hospital bed is located, to provide across line conductors $L_1$ and $L_2$ a source of single-phase a-c line voltage varying in sinusoidal fashion at a frequency of 60 cycles per second or hertz and having a magnitude of approximately 120 volts RMS. Line conductor $L_1$ will connect to the socalled "Hot" terminal of the wall outlet, while line conductor $L_2$ couples to the "Neutral" terminal. One end of conductor 158 connects, through plug 157 and the wall outlet, to the building ground or earth ground, as is also the case with the neutral or $L_2$ conductor. The other end of conductor 158 is connected to the bed's upper frame 12, which of course is preferably constructed of metal and therefore conductive, in order to ground the frame to earth ground.

The 120 volts a-c line voltage across conductors $L_1$ and $L_2$ is isolated and reduced by a step-down transformer 159 having a 6:1 turns ratio, rectified by a full-wave rectifier bridge 161, filtered by filter capacitors 162, and regulated by a voltage regulator 163 to provide regulated positive d-c voltage (labeled V+) of a magnitude appropriate for operating all of the logic circuits and transistors in the control system of FIGS. 18 and 19. Preferably, that d-c voltage will be around +12 volts and the ground plane of reference potential or circuit common, to which the lower terminals of the capacitors 162 are connected, will be zero volts. The circuit common or ground is not connected to the bed frame 12. It is an isolated ground on the printed circuit board and cannot be engaged by the patient or other operator when operating the bed's adjusting apparatus. Of course, all of the terminals in FIGS. 18 and 19 marked V+ are tied or connected to the positive output of the d-c power supply 161–163. The relatively high voltage level V+ (or +12 volts) constitutes logic 1 in the logic circuitry and the zero ground voltage represents logic 0.

Motor 49 takes the form of a two-phase reversible a-c induction motor of conventional construction having, in delta connection, a pair of field windings 164 and 165 and a phase shift capacitor 166. When 120 volts a-c is applied directly across field winding 164, that same voltage, except almost 90° phase shifted, will appear across winding 165 and the motor will rotate in its down direction. As will be fully understood, this means that any of the four adjusting mechanisms (foot, head, back and knee) that is being driven by the motor will cause its adjustable apparatus to descend or lower. In other words, when motor 49 is running in its down direction, the head and foot ends of frame 12, back support 31 and knee supports 33 and 34 may all be lowered simultaneously or individually. Conversely, when 120 volts a-c is applied directly to winding 165 it is phase shifted close to 90° by capacitor 166 and applied across winding 164, with the result that the motor rotates in the opposite or up direction to cause the driven adjusting mechanisms to elevate or raise their associated adjustable apparatus.

A pair of solid state switches, in the form of triacs 168 and 169, are provided to apply the a-c line voltage, across line conductors $L_1$ and $L_2$, directly to either field winding 164 or field winding 165. As is well known, in the absence of any applied voltages a triac assumes its off condition in which a very high impedance exists between its main terminals $T_1$ and $T_2$ to effectively constitute an open switch. When a voltage of either polarity is impressed across the main terminals, the triac remains non-conductive until gate or triggering current of appropriate magnitude is translated between the gate terminal G and the main terminal $T_1$ in either direction, whereupon the triac turns on and permits current flow between terminals $T_1$ and $T_2$ in response to the voltage applied thereto and in the direction determined by the voltage's polarity. Once the triac is rendered conductive, a very low impedance is presented between its main terminals so that it essentially functions as a closed switch, as a consequence of which the full a-c line voltage will be applied directly to either winding 164 or 165 depending on which triac is turned on. As is common with triacs, conduction between terminals $T_1$ and $T_2$ will continue even though the gate current may be terminated so long as there is a potential difference across the main terminals. When the $T_1-T_2$ voltage is reduced to zero, the triac therefor returns to its off state. Thereafter, when the voltage across the main terminals is increased from zero, conduction will not occur until the triac is regated, namely until gate current again flows between gate G and terminal $T_1$.

Since a triac automatically switches to its off condition each time the alternating voltage appearing across its main terminals crosses its a-c axis, at which time a zero potential difference exists between terminals $T_1$ and $T_2$, gate current must be supplied to the gate terminal at some instant following the beginning of each half cycle or alternation if the a-c line voltage, across conductors $L_1$ and $L_2$, is to be applied to the motor for at least a portion of each half cycle. In other words, at the end of each half cycle of one polarity, the triac which is to be effective assumes its non-conductive state. The polarity of the alternating voltage appearing across its main terminals then changes at the start of the next half cycle, thereby requiring retriggering at the gate before the triac turns on and $T_1-T_2$ current flow takes place. As will be made apparent, maximum gate current is supplied to the effective one of triacs 168 and 169 as its $T_1-T_2$ voltage goes through zero amplitude so that immediate regating occurs at the very beginning of the next half cycle.

Triacs 168 and 169 are controlled by photo couplers 171 and 172. Normally, transistors 181 and 182 are turned off and no d-c voltage is applied to the LED's (light emitting diodes) 173 and 174 of photo couplers 171 and 172, respectively, and each of photo resistors 175 and 176 will exhibit a high resistance. Under those conditions, insufficient gate current will flow to the gate terminals of triacs 168 and 169 to turn them on. With both triacs turned off, circuit junctions 177 and 178 in motor 49 will be at the same potential, namely 120 volts a-c with respect to line conductor $L_1$.

Assume now that transistor 181 is made conductive by applying logic 1, or +12 volts d-c, to the transistor's base, thereby grounding the cathode of LED 173 and effecting energization thereof from d-c source V+. The illumination of LED 173 causes the resistance of photo resistor 175 to drop to the extent necessary to supply gate current from junction 178, and via the cross-coupling circuit including current-limiting resistor 183, capacitor 184 and photo resistor 175, to the gate terminal of triac 168 to render the triac conductive. Capacitor 166 initially introduces relatively little phase shift, so during the start-up period the gating voltage at triac 168 will be roughly in phase with the $T_1-T_2$ voltage and the triac will conduct during most of each half cycle. Hence, circuit junction 177 will be intermittently connected to line conductor $L_1$ through triac 168 and the full 120 volts a-c, appearing across conductors $L_1$ and $L_2$, will be applied directly across field winding 164 to effect motor rotation in the down direction. As the motor rotates, the shifted phase voltage across winding 165 effectively adds to the voltage across winding 164 with the result that a voltage of about 240 volts RMS is produced between circuit junction 178 and line conductor $L_1$. Since there is practically no voltage drop from circuit junction 177 and through triac 168 to conductors $L_1$ while the motor rotates, the full 240 volts appears across phase shift capacitor 166.

The gating voltage at triac 168 therefore doubles in magnitude and shifts phase after motor 49 begins rotation. Capacitor 184 provides voltage dropping without power dissipation in order to maintain the gating voltage only as high as necessary to control the triac. A major advantage, however, of using the phase shifted voltage at junction 178 to gate triac 168 is that the gating voltage will be approximately 90° out-of-phase with respect to the $T_1-T_2$ voltage. Most of the 90° phase shift is attributable to capacitor 166 but if its capacitance is insufficient then the capacitance of capacitor 184 may be adjusted so that the two capacitors together will result in a 90° phase shift. With such a phase relationship, the gate current will always be at a maximum when the voltage appearing across terminals $T_1$ and $T_2$ of triac 168 completes one half cycle and passes through zero amplitude to begin the next opposite-polarity half cycle. Having high gate current at the start of a half cycle causes the triac to be gated on immediately so that field winding 164 is essentially continuously connected across line conductors $L_1$ and $L_2$. In effect, it may be likened to gating the triac with d-c voltage. With such continuous operation of the triac, the gating is noise-free and no radio frequency interference is generated.

When logic 1 is subsequently removed from the base of transistor 181, the energizing circuit for photo coupler 171 is broken and triac 168 returns to its off condition in which a very high impedance exists between main terminals $T_1$ and $T_2$, whereupon the a-c line voltage is removed from winding 164 and motor 49 stops its rotation.

Rotation of motor 49 in the opposite or up direction is achieved in similar manner. By applying logic 1 to the base of transistor 182, the energizing circuit for LED 174 of photo coupler 172 is completed and this causes the resistance of photo resistor 176 to lower sufficiently to cause gate current to flow from circuit junction 177, and over the cross-coupling circuit including current-limiting resistor 185, capacitor 186 and photo resistor 176, to the gate terminal of triac 169. The triac is turned on in response to the gate current, as a consequence of which the 120 volts a-c line voltage is supplied to winding 165 to cause the motor to rotate in the up direction. Once the motor begins to rotate, the voltage at junction 177 doubles in magnitude and becomes phase displaced by about 90° relative to the $T_1-T_2$ voltage appearing at triac 169 so that the triac will be retriggered at the very beginning of each half cycle. By then switching the base voltage of transistor 182 from logic 1 to logic 0 the transistor turns off and the energizing circuit for photo coupler 172 opens, thereby turning off triac 169 to disconnect winding 165 from the line voltage source $L_1-L_2$.

The previously discussed switch actuators or push buttons 86, 87, 88 and 89, mounted at the nurse station at the foot end of the bed, are spring-biased and control the normally-open switches 86a, 87a, 88a and 89a, respectively, shown on the left in FIG. 18. These switches are therefore of the momentary contact type which requires the nurse or operator to maintain continuous pressure on a selected spring-biased switch actuator in order to close the associated switch and to hold it closed. Switch 86a is closed when the operator wishes to raise both the head and foot ends of upper frame 12, and switch 87a is closed to lower the frame. Switch 88a is closed when it is desired to establish the bed in the reverse trendelenburg or drainage position (head end up, foot end down), and switch 89a is closed when the bed is to be adjusted to the trendelenburg or shock position (head end down, foot end up). Each of the switches 86a, 88a and 89a must be held closed by the nurse to maintain continuous operation of the circuitry controlled by those switches. Switch 87a, on the other hand, merely must be momentarily closed (thereby issuing a down command) since the switch will cause a latching system to latch in a down operating mode and remain there after the switch is opened.

The three switches 187, 188 and 189 are included in the patient hand control 190 which is cable connected to the rest of the circuitry in FIGS. 18 and 19 and is adapted to be hand held by the patient occupying the bed in order to remotely control the various bed adjustments merely by selectively depressing different spring-biased switch actuators or push buttons, the switches being of the momentary-contact type and being normally open. Preferably, the hospital bed is provided with a holder (for example, on a bed restraining side) for holding control 190 when it is not being operated by the patient. Of course, while hand control 190 is provided primarily for the convenience of the patient, it may be operated by some other operator, such as a doctor, nurse, attendant, etc., to control the same bed adjustments or functions that are controllable by the patient. As indicated by the labels associated with the switches in the patient hand control 190 illustrated in FIG. 18, switch 187 may be actuated, by a knee-up switch actuator, to its up position to raise the knee support sections 33 and 34, and by a knee-down switch actuator to actuate switch 187 to its down position to lower the knee support sections. Similarly, by depressing a back-up actuator switch 188 may be actuated to its up position to elevate back support section 31, and by depressing a back-down actuator switch 188 may be established in its down position to drop the back support section 31. Likewise, the bed switch 189 is actuable by switch actuators to its up position to simultaneously raise both the head and foot ends of upper frame 12, and to its down position to lower the head and foot ends at the same time.

Each of the NAND gates 191–206 produces a logic 1 output (namely, +12 volts d-c) if any of its two inputs is logic 0 or zero volts. With at least one logic 0 input, the output will be logic 1. On the other hand, if both inputs are logic 1, a logic 0 output will be provided. Each of NOR gates 207–219 produces a logic 0 output if at least one of its two inputs is logic 1. Otherwise, with logic 0 at both inputs a logic 1 output is developed. Each of the exclusive OR gates 220, 221, and 222 produces a logic 1 output if one of its two inputs is logic 1 while its other input is logic 0. In other words, when either input is logic 1, but not both, the output will be logic 1. If both inputs are logic 0 or if both inputs are logic 1, the output will be logic 0.

Three pairs of NAND gates (namely, 193 and 194, 197 and 198, and 201 and 202) are combined in conventional fashion to provide three R-S flip-flops, which serve as memory devices since each flip-flop holds the condition or state in which it is established. When an input pulse actuates a flip-flop to one of its two conditions, the flip-flop will remain in that condition after the input pulse terminates. Each of the three R-S flip-flops has a single output and two inputs, an R or reset input and an S or set input. The single output is usually called the Q output of an R-S flip-flop. The $\overline{Q}$ output (the 180° counterpart of the Q output) is not used in the circuitry of FIGS. 18 and 19. The reset input of each flip-flop has greater control over the operation of the flip-flop than the set input, in that the application of logic 0 to the reset input triggers the flip-flop to its reset condition to produce a logic 1 output regardless of the signal level at the set input. Logic 0 on the reset input overrides whatever is applied to the set input. On the other hand, if the reset or R input is established at logic 1, the application of logic 0 to the set or S input actuates the R-S flip-flop to its set condition, thereby producing a logic 0 output. If logic 1 is applied to both of the inputs, nothing will happen and the flip-flop will remain in the condition to which it was previously actuated by a logic 0 on one of the inputs. In short, logic 0 on the R input always generates a logic 1 output, while logic 0 on the S input produces a logic 0 output but only if the R input is logic 1.

There are five monostable or one-shot multivibrators provided in FIG. 19 by NOR gates 212–217, NAND gates 204–206, inverter 223, resistors 224–228 and capacitors 231–235. More particularly, gate 212, inverter 223, resistor 224 and capacitor 231 form a single one-shot multivibrator, the resistor and capacitor determining the time interval that the multivibrator will remain in its abnormal or unstable condition once it is triggered to that condition, after which it will automatically return to its normal stable operating condition. The one-shot multivibrator normally provides logic 0 at its output (namely, the output of inverter 223) but when actuated, by the application to the upper input of gate 212 of a signal excursion or transition going from logic 0 to logic 1, the multivibrator assumes its abnormal condition for a predetermined interval to produce a logic 1 output. At the conclusion of the interval, the output of the multivibrator returns to logic 0. Hence, when the signal level at the upper input of gate 212 switches from logic 0 to logic 1, the multivibrator produces a positive-going pulse having a pulse width determined by resistor 224 and capacitor 231. The pulse width is not critical. Preferably, it is established in the range from 40 to 150 milliseconds.

Gates 204, 213 and 214 and the associated resistors and capacitors form two one-shot multivibrators for producing, when triggered, positive-going pulses of the same width as the pulses produced by inverter 223. Hence, when the upper input of gate 213 switches from logic 0 to logic 1, the output of gate 204 develops a positive-going pulse. Likewise, when the signal level at the lower input of gate 214 changes from logic 0 to logic 1, the output of gate 204 switches from logic 0 to logic 1 and then back to logic 0 to produce a positive-going pulse.

Gates 205, 215 and 216, resistors 227 and 228 and capacitors 234 and 235 also provide dual one-shot multivibrators that function in the same manner as discussed above, producing positive-going pulses at the output of gate 205 whenever either the upper input of gate 215 or the lower input of gate 216 goes from logic 0 to logic 1. Such positive-going pulses will also have the same pulse width as those devloped by inverter 223 and by gate 204.

Consideration will now be given to the operation of the logic circuitry when power is initially applied. It will be assumed that all of the switches 187–189 and 86a–89a are open as shown in FIG. 18. It will also be assumed that the bed is at some intermediate position and not fully down when plug 157 is inserted in the wall outlet. The head low limit switch 155 and the foot low limit switch 152 will therefore both be closed as shown in FIG. 18, thereby applying ground or zero volts (namely logic 0) to both inputs of NAND gate 195. This produces logic 1 at the output of gate 195 for application to the lower input of gate 192 and to the base of transistor 236, the collector of which connects, via conductor 237 and lamp 238, to the upper terminal of the secondary winding of transformer 159. Transistor 236 will therefore conduct and lamp 238 will illuminate in response to a pulsating d-c voltage provided by half wave rectified a-c. The energization of lamp 238, which is preferably mounted at the foot end of the bed, presents a signal to the doctor, nurse, etc., that the bed is not full down, namely not in its lowermost position. Usually, hospital beds are lowered at night, so a signal light is helpful for a nurse to spot the beds that are not all the way down.

Before power is applied, capacitor 239 is uncharged, diode 241 providing a discharge path. At the instant that d-c voltage V+ is developed, the upper or ungrounded side of capacitor 239 will be at zero volts, thereby applying logic 0 to the upper input of NAND gate 192. This produces a logic 1 at the gate's output which is converted to logic 0 by inverter 242. NAND gate 191 therefore generates a logic 1 which is converted to logic 0 by inverter 243. As a consequence, flip-flop 193, 194 receives logic 0 on its reset or R input which triggers the flip-flop to its reset condition to produce a logic 1 output. Inverter 244 converts this output to logic 0 for application to the base of transistor 245, thereby maintaining the transistor in its off condition. After flip-flop 193, 194 has been reset or cleared in response to the initial application of voltage V+, capacitor 239 will charge through resistors 246 and 247 to voltage V+. Thus, when capacitor 239 is fully charged the upper input of gate 192 will be established and held at logic 1. Flip-flop 193, 194 will, however, remain in its reset condition.

With switches 88a and 89a open, the lower inputs of NOR gates 207, 208, 209 and 211 will all be at logic 1, as a result of which the outputs of the gates will be established at logic 0 and none of transistors 248-252 will conduct. Conductors 253-256, which receive logic 1 via the LED's of photo couplers 257-260, respectively, will therefore be connected to conductors 261-264, respectively, to apply logic 1 to the inputs of four of the five one-shot multivibrators. This will have no effect, however, since both the "down bus" and the "up bus" will be at logic 1, exclusive OR gate 220 thereby producing a logic 0 output which is applied over conductor 265 and converted by inverter 266 to a logic 1 signal level for application to the lower inputs of NOR gates 218 and 219. Logic 0 outputs will therefore be developed by the gates for application to the bases of transistors 181 and 182, thereby maintaining the transistors non-conductive. Hence, when power is initially applied to the bed and none of the operator-controlled switches are actuated, solenoids 66-69 and motor 49 will not be energized.

In operation of the logic circuitry, assume that the patient, or some other operator, depresses the knee-up switch actuator to close switch 187 in the up direction. The cathodes of diodes 267 and 268 will thus become grounded to place logic 0 on conductors 256 and 264 and on the up bus. The LED of photo coupler 260 illuminates and lowers the resistance of the associated photo resistor sufficiently to gate the triac 275 into conduction so that the a-c line voltage across line conductors L₁ and L₂ will be rectified by full wave rectifier bridge 276 to provide d-c voltage for energizing knee solenoid 69. Clutch 59 therefore engages in order to couple motor 49 to the knee adjusting mechanism.

In the meantime, the logic 0 on the up bus is applied to the upper input of exclusive OR gate 220, the lower input of which is established at logic 1 by the down bus. Logic 0 on the up bus is also conveyed over conductor 269 to the lower input of exclusive OR gate 222. Note that the upper input of exclusive OR gate 221 will be established at logic 1, received via conductor 271 from the down bus. The logic 0 on conductor 269 and applied to gate 222 could be used to turn transistor 182 on immediately and to command motor 49 to run in the up direction. However, the motor will first be rotated momentarily in the opposite or down direction in order to ensure that the motor will be disengaged from all except the selected knee adjusting mechanism. In this way, if one of the other adjusting mechanisms, say the back adjusting mechanism, had been previously actuated but its clutch did not release or disengage at the end of the actuation, thereby locking the back adjusting mechanism to the motor, then by initially driving the motor momentarily in the direction opposite to the selected desired direction the clutch for the back adjusting mechanism will be unloaded, permitting it to slide back to its disengaged position under the force of its restoring spring.

To explain how this momentary motor reversal occurs, since gate 220 will receive different logic levels on its two inputs when the up bus is grounded by knee switch 187, the output of gate 220 will change from logic 0 to logic 1. The positive-going signal transition is applied to the upper input of gate 212 to trigger the one-shot multivibrator 212, 223, 224, 231, thereby producing a positive-going pulse which is converted by inverter 272 to a negative-going pulse for application to the upper input of NAND gate 206. That input therefore switches from logic 1 to logic 0 and then back to logic 1, as a result of which the output of gate 206 produces a positive-going pulse, switching from logic 0 to logic 1 and then back to logic 0. Hence, for a relatively short interval (40-150 milliseconds) the output of gate 206, and consequently the common input of gates 221 and 222, will be at logic 1. During that time both inputs of gate 221 and the upper input of gate 222 will be at logic 1, while the lower input of gate 222 will be established at logic 0. As a result, the output of gate 221 and the upper input of NOR gate 218 become logic 0, while the output of gate 222 and the upper input of gate 219 become logic 1. Meanwhile, the common input of gates 218 and 219 will receive logic 0 from inverter 266. With both inputs of gate 218 at logic 0, a logic 1 output is developed for application to the base of transistor 181 to turn that transistor on, thereby energizing motor 49 and running it in the down direction. During that same short interval, the different logic levels at the inputs of gate 219 produce a logic 0 output for application to the base of transistor 182, thereby maintaining the transistor non-conductive.

Thus, while the operator has commanded that the motor run in the up direction, it initially is driven in the down direction in order to release all of the clutches except that for the knee adjusting mechanism. At the conclusion of the positive-going pulse from gate 206 the common input of gates 221 and 222 switches from logic 1 to logic 0, whereupon the output of gate 221 switches from logic 0 to logic 1 and the output of gate 222 switches from logic 1 to logic 0. Gate 218 will now receive different logic levels on its inputs, causing the gate's output to switch from logic 1 to logic 0, thereby turning off transistor 181. At the same time, gate 219 now receives similar logic 0 levels at its inputs to produce a logic 1 for turning transistor 182 on. Motor 49 therefore now begins to rotate in the desired up direction and will continue to rotate in that direction as long as the operator continues to depress the knee-up switch actuator.

Of course, had the operator depressed the knee-down actuator to close switch 187 in the down direction it will now be apparent that the motor would initially and momentarily rotate in the up direction, to disengage all clutches except the knee clutch, before it is then run in the down direction. By the same token, from the foregoing explanation the manner in which the back switch 188 controls the operation of solenoid 66 and motor 49 will be understood. The back-up and back-down functions work in essentially the same way as the knee functions.

Turning now to the bed high-low controls, when the bed-up switch actuator is depressed to close switch 189 in the up direction or when the high switch 86a is closed, conductor 273 is grounded and the three diodes connected to that conductor conduct in order to essentially ground conductors 253 and 254 to energize foot solenoid 67 and head solenoid 68, and in order to place logic 0 on the up bus for initially and momentarily running motor 49 in the down direction and for then rotating the motor in the up direction. The actuation of switch 189 or switch 86a also grounds the junction of resistors 246 and 247 to discharge capacitor 239, thereby applying logic 0 to the upper input of gate 192 to reset or clear flip-flip 193, 194. Transistor 245 will thus always be maintained in its off condition while the bed is being elevated. The actuated switch is deactuated when the head and foot adjusting mechanisms have raised frame 12 to the level desired.

While the effects of depressing the bed-up switch actuator in hand control 190 are the same as depressing the switch actuator 86 at the foot end of the bed, this is not true with respect to the bed-down switch actuator and switch actuator 87. When switch 189 is closed in the down direction, conductor 274 is grounded to turn on the three diodes connected to the conductor, thereby essentially grounding conductors 253 and 254, to energize solenoids 67 and 68, and applying logic 0 to the down bus to effect rotation of motor 49, initially and momentarily in the up direction and then in the down direction. When the bed is lowered to the extent desired, the patient, or other operator, releases the bed-down switch actuator to de-energize the motor and solenoids.

Consideration will now be given to the operation of the unique latching system, of the present invention, for lowering both ends of frame 12 directly to their lowermost limits even though the frame may be in a tilted position. This may be accomplished merely by momentarily closing the low switch 87a, thereby issuing a momentary down command. When that happens logic 0 will be applied to the S or set input of flip-flop 193, 194 to trigger the flip-flop to its set condition, thereby providing a logic 0 output which is converted by inverter 244 to logic 1 for turning transistor 245 on. Conductors 253 and 254 will therefore be essentially grounded and the down bus will be established at logic 0. Solenoids 67 and 68 will energize and motor 49 will operate to lower each end of frame 12 simultaneously even though the two ends will start from different levels if the frame is in a tilted position at the time. By employing flip-flop 193, 194, transistor 245 will be maintained conductive, and the bed will continue to lower, after the nurse or attendant releases switch actuator 87 and switch 87a opens. Hence, the latching system (which, of course, includes primarily flip-flop 193, 194, transistor 245 and all of the circuitry operated by the transistor) will be latched or locked in a down operating mode. In fact, it is not even necessary that the nurse or attendant remain at the hospital bed. By latching the system in a down operating mode, the nurse may leave the hospital bed, thereby saving considerable time. For this reason, flip-flop 193, 194 is labeled the "walkaway down flip-flop" in FIG. 18.

The movable frame 12 will continue to descend, after switch 87a opens, until head low limit switch 155 and foot low limit switch 152 are both opened, namely when both ends of frame 12 are all the way down. If frame 12 starts from a tilted position, the lower end will reach its low limit first and will open its limit switch. Thereafter, the higher end of the frame will continue to drop until its low limit is reached and its limit switch is opened. When switches 155 and 152 are both opened, both of the inputs of NAND gate 195 will be at logic 1, as a consequence of which logic 0 will be applied to the base of transistor 236, to extinguish lamp 238, and to the lower input of gate 192 to provide a logic 1 output which is then converted by inverter 242 to logic 0 for application to the upper input of NAND gate 191. Logic 1 will thus be developed at the output of gate 191 which is then converted by inverter 243 to apply logic 0 to the R input of the walkaway down flip-flop 193, 194 to reset the flip-flop to its reset condition, thereby producing a logic 1 output which causes transistor 245 to turn off, whereupon solenoids 67 and 68 and motor 49 de-energize. Hence, when both ends of frame 12 are at their lowermost limit, the latching system is unlatched.

It is to be particularly noted that, with the present invention, frame 12 may be lowered directly from a tilted position to its lowest level, and it is not necessary to first establish the frame at a horizontal level before it can be lowered.

It is to be noted that exclusive OR gate 220 performs another important function in addition to that already described. If two switches are simultaneously actuated, one switch calling for motor rotation in the up direction while the other switch commands motor rotation in the down direction, gate 220 will provide a lockout so that no motor rotation whatsoever can occur. When there are up and down commands simultaneously present, both the down bus and the up bus will be at logic 0, thereby applying logic 0 to both inputs of gate 220 to produce a logic 0 output which is converted by inverter 266 to logic 1 for application to the common input of NOR gates 218 and 219. Logic 0 will therefore be produced at the outputs of those gates and transistors 181 and 182 will be non-conductive.

Assume now that at least two of the adjusting mechanisms are operating at the same time. Assume, for example, that the patient has simultaneously depressed the switch actuators for closing all three switches 187, 188 and 189 in the up direction. Solenoids 66–69 will all be energized and, after an initial momentary counterrotation, motor 49 will rotate in the up direction to raise upper frame 12, back support section 31 and knee support sections 33 and 34. At this time each of the four conductors 261–264 will be established at logic 0, thereby applying logic 0 to the upper inputs of NOR gates 213 and 215 and to the lower inputs of gates 214 and 216. Assume that when the back support section reaches the tilted position desired by the patient, continued elevation of the upper frame and knee support sections is desired. The patient will therefore release the back-up switch actuator on hand control 190 to open switch 188, while continuing to depress the bed-up and knee-up switch actuators. Back solenoid 66 will immediately be de-energized, and the direction of motor rotation will be momentarily reversed in order to release clutch 56 and unlock the engaging lug surfaces on clutch 56 and gear 52. With this arrangement, any adjusting mechanism may be decoupled from the motor drive while other adjusting mechanisms continue to be actuated by the motor drive. Momentary motor reversal occurs whenever one of the actuated adjusting mechanisms is deactivated.

To explain, when the back-up switch is opened by the patient, conductor 263 changes from logic 0 to logic 1 (receiving logic 1 via conductor 255 and the LED of photo coupler 259), thereby triggering the one-shot multivibrator, comprising gates 205 and 215, resistor 227 and capacitor 234, to produce a positive-going pulse (namely, going from logic 0 to logic 1 and then back to logic 0) at the output of gate 205 for application to the lower input of gate 217. The pulse is converted to a negative-going pulse in gate 217, which is then converted in gate 206 back to a positive-going pulse for application to the common input of gates 221 and 222. Such a pulse effectively momentarily reverses the operation of gates 221 and 222. To elucidate, prior to the application of the positive-going pulse, the upper input of gate 221 is at logic 1 while its lower input and both inputs of gate 222 are at logic 0. This condition produces a logic 1 at the output of gate 221 and a logic 0 at the output of gate 222, thereby effecting conduction of transistor 182 and non-conduction of transistor 181 in order to run the motor in the up direction. When the positive-going pulse is then applied to the common input of gates 221 and 222, both inputs of gate 221 and the upper input of gate 222 will be at logic 1 while the lower input of gate 222 will be established at logic 0. With those signal conditions, gate 221 now momentarily switches to a logic 0 output and gate 222 momentarily switches to a logic 1 output to turn transistor 181 on and to turn transistor 182 off. As a consequence, the motor rotation in the up direction will be interrupted for a short interval (40–150 milliseconds) during which time the motor will be rotated in the down direction. During the motor reversal interval, clutch 56 will be unloaded and unlocked so that restoring spring 65 will be able to return the clutch to its disengaged position.

It will now be understood that the deactivation of any function, while at least one other function continues to operate, will cause the motor to momentarily reverse directions in order to decouple the motor drive from the deactivated function.

Consideration will now be given to the operation of the control circuitry when it is desired to tilt the bed in either direction. Assume, for example, that it is desired to tilt upper frame 12 in the head-down, foot-up direction. Assume also that frame 12 is not in its lowermost position at this time. To achieve the desired tilting, trendelenburg switch 89a must be closed. Prior to the switch closing, capacitor 277 will be uncharged since each side is connected to voltage source V+, through resistors 278 and 279. When switch 89a is closed, the lower side of capacitor 277 is grounded and the upper side will instantaneously be established at logic 0. The upper input of NAND gate 196 thus becomes logic 0 to provide a logic 1 output which is then converted by inverter 281 to logic 0 for application to the lower input of gate 191. Logic 1 will therefore be produced by gate 191 to achieve resetting of the walkaway down flip-flop 193, 194, if it isn't already in its reset condition. The logic 0, produced at the junction of capacitor 277 and resistor 278 in response to the initial closing of switch 89a, will also be applied to the reset or S input of flip-flop 197, 198 but it will have no affect on the operation of that flip-flop since its reset or R input will be grounded via the closed head low limit switch 155. Logic 0 will therefore be applied to the R input and such a logic level will override whatever is applied to the S input and will establish flip-flop 197, 198 in its reset condition, thereby applying logic 1 to the upper input of gate 207 and to the upper input of gate 199. Meanwhile, the logic 0, provided by the closed switch 155, will be converted by inverter 282 to logic 1 for application to the lower input of gate 199. With logic 1 at both of its inputs, gate 199 produces a logic 0 for the upper input of gate 208, whose lower input, as well as the lower input of gate 207, will be established at logic 0 by the closed switch 89a. The dissimilar logic levels at the inputs of gate 207 result in a logic 0 output applied to the base of transistor 248, thereby maintaining the transistor non-conductive. Both of the inputs of gate 208 will be at logic 0, however, so a logic 1 output will be developed for the base of transistor 249, turning that transistor on in order to ground conductor 254 and to place logic 0 on the down bus.

After an initial and momentary counterrotation in the up direction, the head end of upper frame 12 will therefore descend and will continue to drop as long as the operator maintains switch 89a closed. Assuming that switch 89a is kept closed until the head end of frame 12 drops to its lowermost level, at that time switch 155 will open and the R input of flip-flop 197, 198 will change from logic 0 to logic 1, as will the input of inverter 282. The condition of the flip-flop will not change at this time, however, because the S input will be established at logic 1. This occurs because capacitor 277 begins to charge through resistor 278 to voltage V+ as soon as switch 89a is closed. Hence, the junction of capacitor 277 and resistor 278 will be at logic 1 when the head end lowers to its full down position and opens switch 155. With both its R and S inputs at logic 1, the flip-flop remembers or stays in its present condition, namely its reset condition. Although the flip-flop does not switch conditions when switch 155 opens, transistor 249 will be turned off to de-energize head solenoid 68 and motor 49. To explain, since the input of inverter 282 will now be logic 1, its output will be logic 0, thereby producing logic 1 at the output of gate 199. The inputs of gate 208 will now be dissimilar, as a consequence of which logic 0 will be applied to the base of transistor 249 to render it non-conductive.

Transistors 248 and 249 are therefore both turned off, even though the operator continues to depress switch actuator 89 to maintain switch 89a closed. If additional head-down, foot-up tilting is desired, the operator merely must release the switch actuator 89 and then immediately re-depress it, thereby momentarily opening switch 89a. As soon as the switch opens, capacitor 277 discharges since both sides of the capacitor will be connected to voltage source V+. When switch 89a then re-closes, the upper side of the capacitor, and consequently the S input of flip-flop 197, 198, will be instanteously at logic 0. This time, however, since the R input is at logic 1, the logic 0 on the S input will trigger the flip-flop from its reset to its set condition. Logic 0 is consequently produced at the output of flip-flip 197, 198. Both inputs of gate 199 will then be logic 0 to produce logic 1 for the upper input of gate 208, the lower input of which receives logic 0 from the re-closed switch 89a. With the two inputs of gate 208 at different logic levels, a logic 0 will result and transistor 249 will remain non-conductive. Gate 207, on the other hand, will now receive logic 0 at both of its inputs, resulting in a logic 1 which turns transistor 248 on, thereby grounding conductor 253 to energize foot solenoid 67 and apply logic 0 to the up bus to run the motor in the up direction, after of course the initial momentary rotation in the down direction. The foot end of frame 12 will therefore elevate and will continue to rise as long as switch 89a is maintained closed by the operator. If the maximum tilt is desired, the foot end of the bed will be raised to its uppermost position.

Hence, by actuating trendelenburg switch 89a, the head end of the upper frame 12 will first go all the way down, if it isn't already there, and then the foot end will be raised. Note that this action will occur regardless of the horizontal level of frame 12 and even though it may already be tilted in either one of its two tilt directions. In other words, the upper frame will be tilted directly to a trendelenburg position regardless of its position at the time that switch 89a is closed.

It will now be apparent that by closing the reverse trendelenburg switch 88a, frame 12 may be tilted directly in the opposite or head-up, foot-down direction. If the foot end of frame 12 is not already at its low limit, transistor 252 will initially be turned on (while transistor 251 will be off) to energize the foot solenoid 67 and to drive the motor 49 in its down direction, thereby lowering the foot end of frame 12. When the lowermost level is reached and switch 152 opens, transistor 252 will be rendered non-conductive. Switch actuator 88 may then be released and re-depressed to trigger flip-flop 201, 202 to its set condition, as a result of which transistor 251 will be turned on to raise the head end of frame 12 to the extent desired.

It will be noted that, by actuating switches 88a and 89a, frame 12 may be moved from any tilted or level position directly to any other tilted or level position. It is not necessary, for example, to first level the bed in its uppermost or lowermost position before the bed may then be established in the trendelenburg or reverse trendelenburg position. The bed can go from trendelenburg directly to reverse trendelenburg and vice versa. Note also that when the bed is in the trendelenburg position, it may be leveled by actuating the reverse trendelenburg switch 88a, and when in the reverse trendelenburg position the bed may be leveled by operating the trendelenburg switch 89a. Moreover, by operating the highlow switches 86a, 87a and 189, the entire frame 12 may be raised or lowered even though it may be tilted. It is also to be realized that both ends of frame 12 may be lowered to their lowermost level, even though the frame is tilted, by closing switch 87a and actuating the walkaway down flip-flop 193, 194.

The invention provides, therefore, an adjustable motorized hospital bed featuring a unique operator-controlled latching system for causing the bed's movable frame to quickly shift, from any level and from any tilted position, directly to its lowermost level. Moreover, relatively simple steps are required on the part of the operator.

While a particular embodiment of the invention has been shown and described, modifications may be made, and it is intended in the appended claims to cover all such modifications as may fall within the true spirit and scope of the invention.

We claim:

1. An adjustable hospital bed comprising: a movable frame having head and foot ends; independently actuable head and foot adjusting mechanisms for raising and lowering the head and foot ends, respectively, of said movable frame; head drive means for actuating said head adjusting mechanism to adjust the height of the frame's head end; foot drive means, for actuating said foot adjusting mechanism to adjust the height of the frame's foot end; and a latching system, responsive to a momentary down command, for operating said head and foot drive means to lower each end of said movable frame directly to its lowermost level regardless of the frame's position, and even though the frame may be tilted, at the time the command is issued, said latching system including an R-S flip-flop which is established in response to a down command and when at least one end of said movable frame is above its lowermost limit, in its set condition to cause said head and foot drive means to lower each end of said frame, said R-S flip-flop being triggered to its reset condition when both ends of said frame have reached their low limit.

2. An adjustable hospital bed according to claim 1 and including a head low limit switch and a foot low limit switch both of which must be actuated in order to trigger said R-S flip-flop to its reset condition.

3. An adjustable bed comprising: a movable frame having head and foot ends and being capable of moving from a generally horizontal position in which the head and foot ends of the frame are generally in lowermost positions to other and higher elevated positions in which the frame may be horizontal or inclined such that the head end is above the foot end or vice-versa; head elevating means for supporting the head end of the frame and being movable relative to the frame to change elevation of the head end, the head elevating means including a rotatable element which when turned normally effects a change in the elevation of the head end of the frame; foot elevating means for supporting the foot end of the frame and being movable relative to the frame to change the elevation of the foot end, the foot elevating means including a rotatable element which when turned normally effects a change in the elevation of the foot end of the frame; an electric motor mounted on the frame and being capable of operating in both directions of rotation; electrically operated head and foot clutch means for engaging the motor with the rotatable elements of the head and foot elevating means, respectively, such that the motor turns those elements, the clutch means being operable independently or simultaneously and when operated simultaneously causing the rotatable elements to revolve such that the head and foot ends of the frame undergo the same direction of elevational movement; and a control circuit including: a down switch, a head limit switch which senses when the head end of the frame is in its lowermost position and a foot limit switch which senses when the foot end of the frame is in its lowermost position, and latching means connected to the down switch and to the limit switches for, when the down switch is actuated even momentarily, operating the clutch means such that they engage the motor with rotatable elements, for also at that time energizing the motor in the direction which causes the rotatable elements to lower the frame at both of its ends, for further keeping each of the clutches so engaged until, at least until one end of the frame reaches its lowermost position, and for keeping the motor energized until both of the limit switches sense that their respective ends of the frame are in their lowermost positions.

4. An adjustable hospital bed according to claim 3 wherein said latching means, in the event that said movable frame is tilted at the time the down switch is actuated, causes both ends of said movable frame to simultaneously descend until the lower end reaches its lowermost position, whereupon the higher end continues to lower until that end reaches its lowermost position.

5. An adjustable bed according to claim 3 wherein the control circuit includes a momentary up switch; and wherein the circuit, when the up switch is actuated, is capable of causing both of the clutches to engage and of further energizing the motor in the direction which causes the head and foot ends of the frame to rise, but only for so long as the up switch is actuated.

6. An adjustable bed according to claim 5 wherein the control circuit includes another down switch of the momentary variety; and wherein the circuit, when the other down switch is actuated, is capable of causing both of the clutches to engage and of further energizing the motor in the direction which causes the head and foot ends of the frame to descend, but only for so long as the other down switch is actuated.

7. An adjustable bed according to claim 3 wherein the control circuit further includes a trendelenburg switch; and wherein the circuit, when the trendelenburg switch is actuated, is capable of causing the head clutch to engage and of energizing the motor in the direction which lowers the head end of the frame, and is further capable, once the head limit switch senses that the head end of the frame is in its lowermost position, of causing the head clutch to disengage and the foot clutch to engage as well as energizing the motor in the opposite direction, whereby the foot end of the frame elevates.

8. An adjustable bed according to claim 7 wherein the control circuit further includes a reverse trendelenburg switch; and wherein the circuit, when the reverse trendelenburg switch is actuated, is capable of causing the foot clutch to engage and of energizing the motor, and is further capable, once the foot limit switches senses that the foot end of the frame is in its lowermost position, of causing the foot clutch to disengage and the head clutch to engage as well as energizing the motor in the opposite direction, whereby the head end of the frame elevates.

9. An adjustable bed according to claim 3 wherein the head and foot elevating means include means for allowing either one of the head or foot rotatable elements to turn without further descent of the end of the frame with which that rotatable element is associated when that end of the frame reaches its lowermost position, whereby the opposite end of the frame continues to descend until the limit switch for that end is actuated.

10. An adjustable bed according to claim 3 wherein each rotatable element is a screw and the elevating means of which that rotatable element forms a part further includes a nut which moves along the screw when the screw revolves.

11. An adjustable bed according to claim 10 wherein the head limit switch is actuated by the nut on the screw of the head elevating means and the down limit switch is actuated by the nut on the screw of the foot elevating means.

12. An adjustable bed comprising: a movable frame having head and foot ends and being capable of moving from a generally horizontal position in which the head and foot ends of the frame are generally in lowermost positions to other and higher elevated positions in which the frame may be horizontal or inclined such that the head end is above the foot end or vice-versa; head elevating means for supporting the head end of the frame and being movable relative to the frame to change elevation of the head end, the head elevating means including a rotatable drive screw, a nut which normally travels along the screw when the screw is turned to effect a change in the elevation of the head end of the frame, and means for allowing the screw to rotate without causing a further movement of the nut along the screw when the head end of the frame reaches its lowermost position; foot elevating means for supporting the foot end of the frame and being movable relative to the frame to change the elevation of the foot end, the foot elevating means including a rotatable drive screw, a nut which normally travels along the screw when the screw is turned to effect a change in the elevation of the foot end of the frame, and means for allowing the screw to rotate without a further movement of the nut along the screw when the foot end of the frame reaches its lowermost position; an electric motor capable of operating in both directions of rotation; electrically operated head and foot clutch means for engaging the motor with the rotatable drive screws of the head and foot elevating means, respectively, such that the motor turns those screws, the clutch means being operable independently or simultaneously and when operated simultaneously causing the drive screws to revolve such that the head and foot ends of the frame undergo the same direction of elevational movement; and a control circuit including; a down switch, a head limit switch which senses when the head end of the frame is in its lowermost position and a foot limit switch which senses when the foot end of the frame is in its lowermost position, and latching means connected to the down switch is actuated even momentarily, operating the clutch means such that they engage the motor with the two drive screws, for also at that time energizing the motor in the direction which causes the drive screws to lower the frame at both of its ends, and for further keeping each of the clutches so engaged until both of the limit switches sense that their respective ends of the frame are in their lowermost positions, whereby the drive screw for the end of the frame which reaches its lowermost position first will after reaching that position continue to rotate, without effecting a further descent of its end of the frame, until both ends of the frame reach their lowermost positions.

* * * * *

UNITED STATES PATENT AND TRADEMARK OFFICE
CERTIFICATE OF CORRECTION

PATENT NO. : 4,472,845
DATED : September 25, 1984
INVENTOR(S) : Dennis S. Chivetta and Joseph A. Volk, Jr.

It is certified that error appears in the above-identified patent and that said Letters Patent is hereby corrected as shown below:

Column 24, Claim 1, line 15, ---which is independently operable relative to said head drive means--- should be inserted after "means,".

Column 26, Claim 12, line 49, ---and to the limit switches for, when the down switch--- should be inserted after "switch".

Signed and Sealed this

Twelfth Day of March 1985

[SEAL]

Attest:

DONALD J. QUIGG

Attesting Officer

Acting Commissioner of Patents and Trademarks